United States Patent
Sugio et al.

(10) Patent No.: US 11,240,483 B2
(45) Date of Patent: Feb. 1, 2022

(54) THREE-DIMENSIONAL MODEL DISTRIBUTION METHOD AND THREE-DIMENSIONAL MODEL DISTRIBUTION DEVICE

(71) Applicant: Panasonic Intellectual Property Corporation of America, Torrance, CA (US)

(72) Inventors: Toshiyasu Sugio, Osaka (JP); Toru Matsunobu, Osaka (JP); Satoshi Yoshikawa, Hyogo (JP); Tatsuya Koyama, Kyoto (JP); Yoichi Sugino, Osaka (JP)

(*) Notice: Subject to any disclaimer, the term of this patent is extended or adjusted under 35 U.S.C. 154(b) by 0 days.

(21) Appl. No.: 17/088,881

(22) Filed: Nov. 4, 2020

(65) Prior Publication Data

US 2021/0051309 A1 Feb. 18, 2021

Related U.S. Application Data

(63) Continuation of application No. 16/423,451, filed on May 28, 2019, now Pat. No. 10,863,162, which is a
(Continued)

(51) Int. Cl.
*H04N 13/194* (2018.01)
*H04N 13/161* (2018.01)
(Continued)

(52) U.S. Cl.
CPC ........... *H04N 13/194* (2018.05); *G06T 17/00* (2013.01); *H04N 13/111* (2018.05);
(Continued)

(58) Field of Classification Search
CPC ..................................................... G06T 17/00
See application file for complete search history.

(56) References Cited

U.S. PATENT DOCUMENTS

| 5,714,997 A | 2/1998 | Anderson |
| 5,850,226 A | 12/1998 | Nagasawa et al. |
| (Continued) | | |

FOREIGN PATENT DOCUMENTS

| CN | 103460250 A | 12/2013 |
| JP | 9-237354 | 9/1997 |
| (Continued) | | |

OTHER PUBLICATIONS

Extended European Search Report dated Aug. 2, 2019 in corresponding European Patent Application No. 17875260.6.
(Continued)

*Primary Examiner* — Shivang I Patel
(74) *Attorney, Agent, or Firm* — Wenderoth, Lind & Ponack, L.L.P.

(57) ABSTRACT

A three-dimensional model distribution method includes: distributing a first model, which is a three-dimensional model of a target space in a target time period, in a first distribution mode; and distributing a second model, which is a three-dimensional model of the target space in the target time period and makes a smaller change per unit time than the first model, in a second distribution mode different from the first distribution mode.

11 Claims, 18 Drawing Sheets

▨ : STATIONARY CAMERA
▢ : FREE-VIEWPOINT CAMERA (VIRTUAL CAMERA)

Related U.S. Application Data continuation of application No. PCT/JP2017/041424, filed on Nov. 17, 2017.

(60) Provisional application No. 62/428,061, filed on Nov. 30, 2016.

(51) Int. Cl.

| | | |
|---|---|---|
| *H04N 13/111* | (2018.01) | |
| *G06T 17/00* | (2006.01) | |
| *H04N 21/218* | (2011.01) | |
| *H04N 21/81* | (2011.01) | |
| *H04N 21/2343* | (2011.01) | |
| *H04N 21/6587* | (2011.01) | |

(52) U.S. Cl.
CPC ..... *H04N 13/161* (2018.05); *H04N 21/21805* (2013.01); *H04N 21/2343* (2013.01); *H04N 21/6587* (2013.01); *H04N 21/816* (2013.01)

(56) References Cited

U.S. PATENT DOCUMENTS

| | | | |
|---|---|---|---|
| 5,850,352 A | 12/1998 | Moezzi | |
| 2005/0117019 A1* | 6/2005 | Lamboray | G06T 9/00 |
| | | | 348/159 |
| 2006/0285747 A1 | 12/2006 | Blake et al. | |
| 2013/0188708 A1* | 7/2013 | Rusert | H04N 19/50 |
| | | | 375/240.12 |
| 2013/0342640 A1 | 12/2013 | Li et al. | |
| 2016/0112674 A1 | 4/2016 | Li et al. | |
| 2016/0219241 A1 | 7/2016 | Korneliussen et al. | |
| 2018/0027248 A1 | 1/2018 | Yang | |

FOREIGN PATENT DOCUMENTS

| | | |
|---|---|---|
| JP | 2007-519285 | 7/2007 |
| JP | 2008-547097 | 12/2008 |
| WO | 01/13645 A2 | 2/2001 |
| WO | 2005/053321 | 6/2005 |
| WO | 2006/138730 | 12/2006 |

OTHER PUBLICATIONS

International Search Report (ISR) dated Jan. 23, 2018 in International (PCT) Application No. PCT/JP2017/041424.

Xianguo Zhang, et al., "Background-Modeling-Based Adaptive Prediction for Surveillance Video Coding", IEEE Transactions on Image Processing, vol. 23, No. 2, Feb. 2014, pp. 769-784.

Office Action with search report dated Apr. 25, 2021 in counterpart CN patent application No. 201780073141.8, with English translation of the search report.

Summons to attend Oral Proceedings dated Jun. 9, 2021 in counterpart European Patent Application No. 17875260.6.

Yuichi Ohta et al., "Live 3D Video in Soccer Stadium", International Journal of Computer Vision, Kluwer Academic Publishers, BO, vol. 75, No. 1, Feb. 14, 2007 (Feb. 14, 2007), pp. 173-187, XP019534972.

\* cited by examiner

THREE-DIMENSIONAL MODEL DISTRIBUTION METHOD AND THREE-DIMENSIONAL MODEL DISTRIBUTION DEVICE

CROSS REFERENCE TO RELATED APPLICATIONS

This application is a continuation of U.S. patent application Ser. No. 16/423,451, filed May 28, 2019 which is a U.S. continuation application of PCT International Patent Application Number PCT/JP2017/041424 filed on Nov. 17, 2017, claiming the benefit of priority of U.S. Provisional Patent Application No. 62/428,061 filed on Nov. 30, 2016, the entire contents of which are hereby incorporated by reference.

BACKGROUND

1. Technical Field

The present disclosure relates to a three-dimensional model distribution method for distributing a three-dimensional model and a three-dimensional model distribution device.

2. Description of the Related Art

Japanese Unexamined Patent Application Publication No. 9-237354 discloses a method of transferring three-dimensional data. In Japanese Unexamined Patent Application Publication No. 9-237354, three-dimensional data is transferred to a network for each element, for example, a polygon or a voxel. The three-dimensional data is captured by a receiving side and is expanded into an image displayed for each of the received elements.

SUMMARY

In a three-dimensional model distribution method for distributing a three-dimensional model and a three-dimensional model distribution device, proper distribution in response to a request has been demanded.

An object of the present disclosure is to provide a three-dimensional model distribution method or a three-dimensional model distribution device that can achieve proper distribution in response to a request.

In order to achieve the aforementioned object, a three-dimensional model distribution method according to an aspect of the present disclosure includes: distributing a first model, which is a three-dimensional model of a target space in a target time period, in a first distribution mode; and distributing a second model, which is a three-dimensional model of the target space in the target time period and makes a smaller change per unit time than the first model, in a second distribution mode different from the first distribution mode.

A three-dimensional model distribution method according to an aspect of the present disclosure includes: generating a third model, as a difference between a first model and a second model, from the first model that is a three-dimensional model of a plurality of objects included in a target space in a target time period and the second model that is a three-dimensional model of some of the plurality of objects included in the target space in the target time period; distributing the second model in a first distribution mode; and distributing the third model in a second distribution mode different from the first distribution mode.

Note that these general and specific aspects may be implemented as a system, a method, an integrated circuit, a computer program, or may be implemented as a computer-readable recording medium such as a CD-ROM, or as any combination of a system, a method, an integrated circuit, a computer program, or a computer-readable recording medium.

The present disclosure can provide a three-dimensional model distribution method or a three-dimensional model distribution device that can achieve proper distribution in response to a request.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
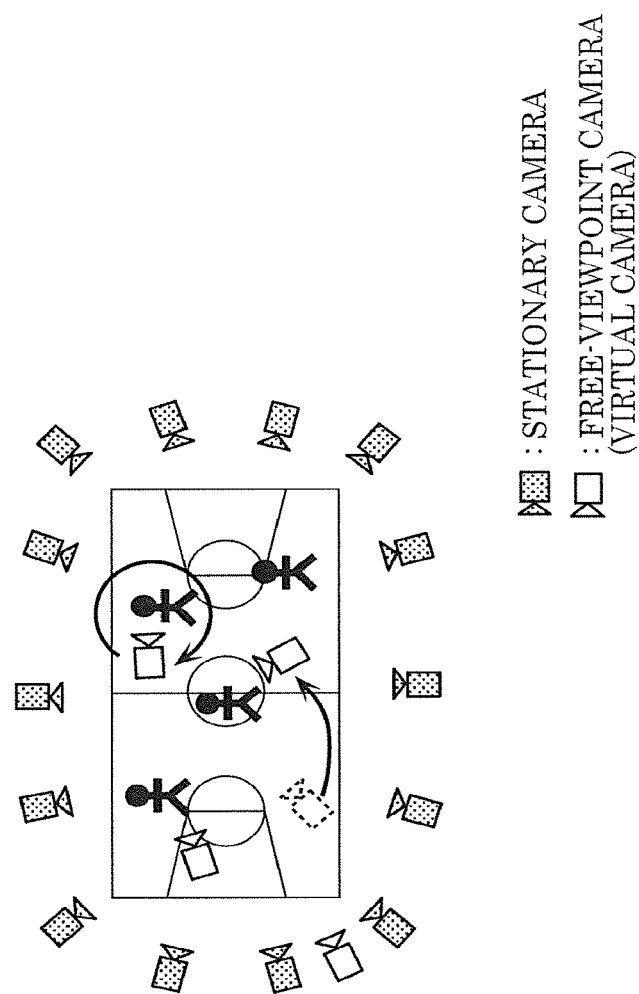
FIG. 1 is a block diagram illustrating the outline of a free-viewpoint video generating system according to Embodiment 1.

A three-dimensional model distribution method according to an aspect of the present disclosure includes: distributing a first model, which is a three-dimensional model of a target space in a target time period, in a first distribution mode; and distributing a second model, which is a three-dimensional model of the target space in the target time period and makes a smaller change per unit time than the first model, in a second distribution mode different from the first distribution mode.

Thus, the three-dimensional model distribution method can distribute the first model and the second model, which make different changes per unit time, in the appropriate distribution modes. Therefore, the three-dimensional model distribution method can achieve proper distribution in response to a request.

For example, the first distribution mode may have a shorter distribution period than a distribution period of the second distribution mode.

Hence, the three-dimensional model distribution method can distribute the first model and the second model, which make different changes per unit time, in the appropriate distribution modes.

For example, a first encoding method may be used in the first distribution mode, and a second encoding method having a larger processing delay than the first encoding method may be used in the second distribution mode.

Thus, the three-dimensional model distribution method can reduce the processing delay of the first model.

For example, a first encoding method may be used in the first distribution mode, and a second encoding method having different encoding efficiency from the first encoding method may be used in the second distribution mode.

Hence, the three-dimensional model distribution method can distribute the first model and the second model, which make different changes per unit time, using the appropriate encoding methods.

For example, the first distribution mode may have a lower delay than the second distribution mode.

Thus, the three-dimensional model distribution method can reduce the delay of the first model.

For example, the three-dimensional model distribution method may further include: generating the first model according to a first generating method; and generating the second model according to a second generating method having different accuracy from the first generating method.

Hence, the three-dimensional model distribution method can distribute the first model and the second model, which make different changes per unit time, according to the appropriate generating methods.

For example, in the generating of the first model, the first model may be generated as a difference between a third model and the second model, from the third model that is a three-dimensional model of a plurality of objects included in the target space in the target time period and the second model that is a three-dimensional model of some of the plurality of objects included in the target space in the target time period.

Thus, the three-dimensional model distribution method can easily generate the first model.

For example, in the generating of the first model: a third multi-viewpoint image may be generated as a difference between a first multi-viewpoint image of a plurality of objects included in the target space in the target time period and a second multi-viewpoint image of some of the plurality of objects; and the first model may be generated by using the third multi-viewpoint image.

For example, terminals at distribution destinations of the first model and the second model may generate free-viewpoint video from selected viewpoints by using the first model and the second model, and the three-dimensional model distribution method may preferentially distribute the first model necessary for generating the free-viewpoint video.

Thus, the three-dimensional model distribution method can efficiently distribute information necessary for generating free-viewpoint video.

A three-dimensional model distribution method according to an aspect of the present disclosure includes: generating a third model, as a difference between a first model and a second model, from the first model that is a three-dimensional model of a plurality of objects included in a target space in a target time period and the second model that is a three-dimensional model of some of the plurality of objects included in the target space in the target time period; distributing the second model in a first distribution mode; and distributing the third model in a second distribution mode different from the first distribution mode.

Thus, the three-dimensional model distribution method can distribute the second model and the third model in the appropriate distribution modes. Therefore, the three-dimensional model distribution method can achieve proper distribution in response to a request.

A three-dimensional model distribution device according to an aspect of the present disclosure includes: a first distributor that distributes a first model in a first distribution mode, the first model being a three-dimensional model of a target space in a target time period; and a second distributor that distributes a second model in a second distribution mode different from the first distribution mode, the second model being a three-dimensional model of the target space in the target time period and making a smaller change per unit time than the first model.

Thus, the three-dimensional model distribution device can distribute the first model and the second model, which make different changes per unit time, in the appropriate distribution modes. Therefore, the three-dimensional model distribution method can achieve proper distribution in response to a request.

A three-dimensional model distribution device according to an aspect of the present disclosure includes: a three-dimensional model generator that generates a third model, as a difference between a first model and a second model, from the first model that is a three-dimensional model of a plurality of objects included in a target space in a target time period and the second model that is a three-dimensional model of some of the plurality of objects included in the target space in the target time period; and a distributor that distributes the second model in a first distribution mode and distributes the third model in a second distribution mode different from the first distribution mode.

Thus, the three-dimensional model distribution device can distribute the second model and the third model in the appropriate distribution modes. Therefore, the three-dimensional model distribution method can achieve proper distribution in response to a request.

Note that these generic or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The following describes embodiments with reference to the drawings. Note that the following embodiments show exemplary embodiments of the present disclosure. The numerical values, shapes, materials, structural components, the arrangement and connection of the structural components, steps, the processing order of the steps, etc. shown in the following embodiments are mere examples, and thus are not intended to limit the present disclosure. Of the structural components described in the following embodiments, structural components not recited in any one of the independent claims that indicate the broadest concepts will be described as optional structural components.

Embodiment 1

The outline of the present embodiment will be first described below. The present embodiment will describe a method of generating and distributing a three-dimensional model in a three-dimensional space recognizing system, e.g., a next-generation wide area monitoring system or a free-viewpoint video generating system.

FIG. 1 illustrates the outline of a free-viewpoint video generating system. For example, the same space is shot using calibrated cameras (e.g., stationary cameras) from multiple viewpoints, so that the shot space can be three-dimensionally reconstructed (three-dimensional space reconstruction). Tracking, scene analysis, and video rendering are performed using the three-dimensionally reconstructed data, thereby generating video from any viewpoint (free viewpoint camera). This can achieve a next-generation wide area monitoring system and a free viewpoint video generating system.

In such a system, a three-dimensional model generated by three-dimensional reconstruction is distributed via a network or the like and processing such as tracking, scene analysis, and video rendering is performed by a receiving terminal. However, the three-dimensional model has quite a large amount of data and thus may cause an insufficient network band, so that it takes a long time to receive the model.

In the present embodiment, a foreground model and a background model that constitute a three-dimensional model are separately distributed in different distribution modes. For example, a network band can be suppressed during distribution by suppressing the number of times of distribution of background models that are updated only a few times. This can shorten the reception time of a terminal.

Figure 2:
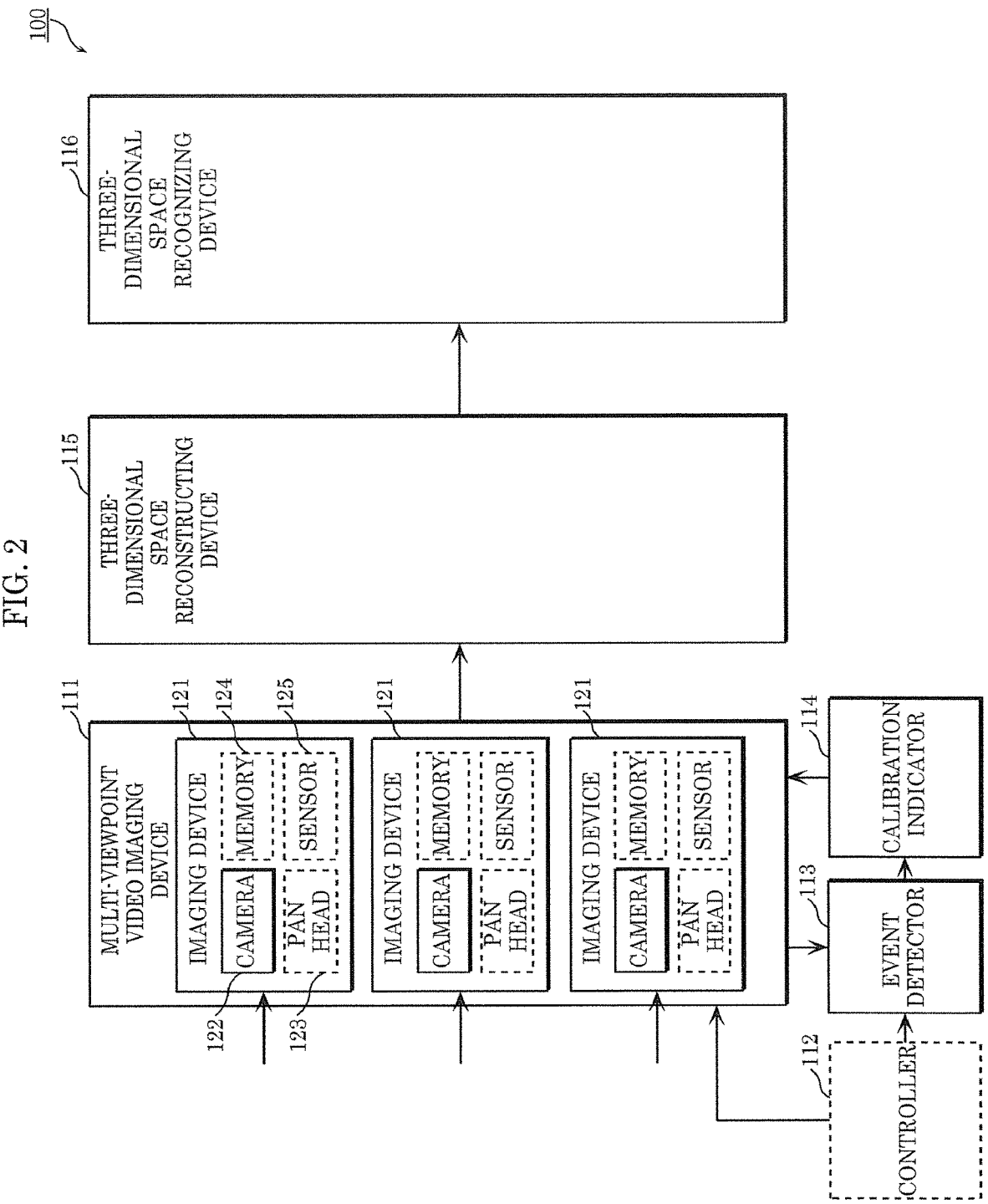
FIG. 2 is a block diagram illustrating the configuration of a three-dimensional space recognizing system according to Embodiment 1.

The configuration of three-dimensional space recognizing system 100 according to the present embodiment will be described below. FIG. 2 is a block diagram illustrating the configuration of three-dimensional space recognizing system 100. Three-dimensional space recognizing system 100 includes multi-viewpoint video imaging device 111, controller 112, event detector 113, calibration indicator 114, three-dimensional space reconstructing device 115, and three-dimensional space recognizing device 116.

Figure 3:
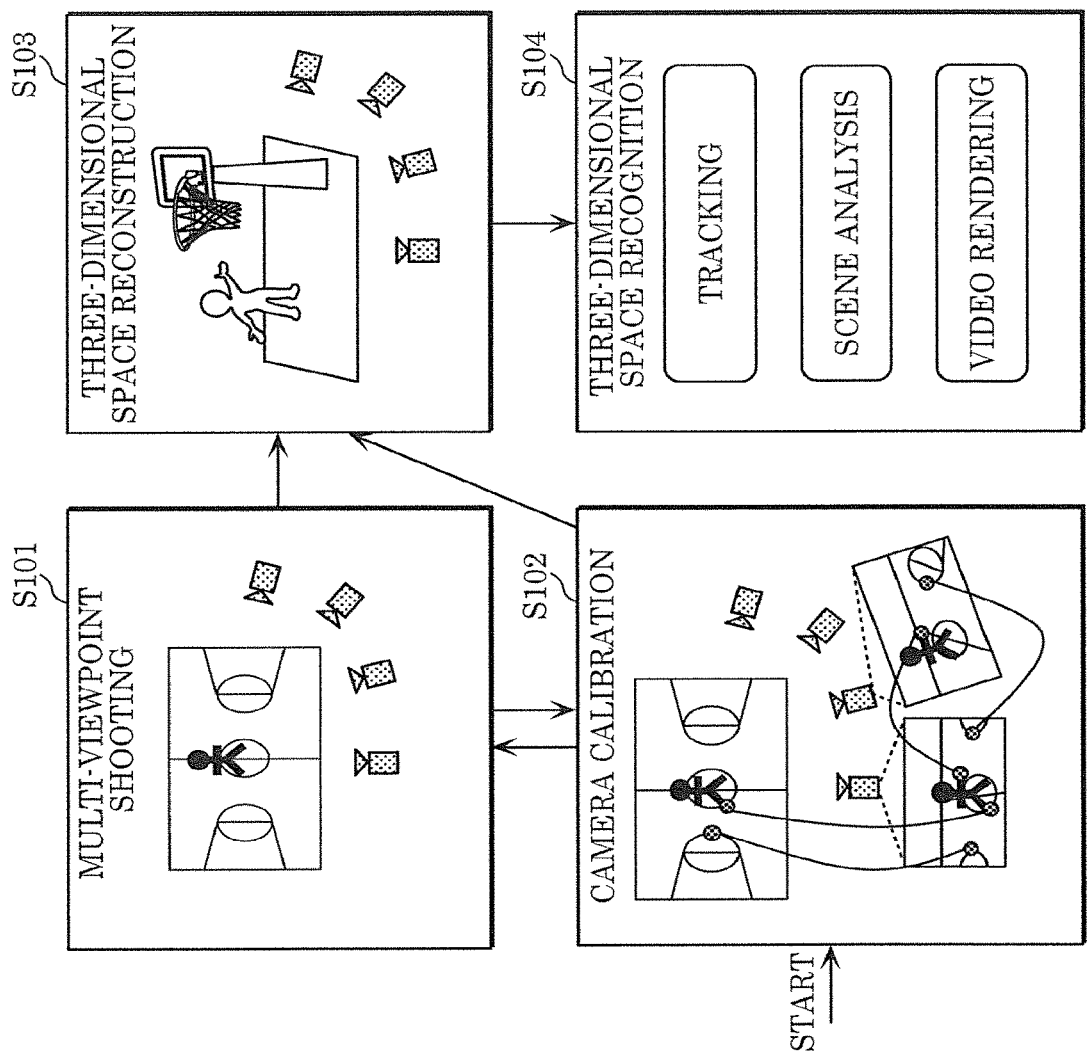
FIG. 3 illustrates the outline of the operations of the three-dimensional space recognizing system according to Embodiment 1.

FIG. 3 illustrates the outline of the operations of three-dimensional space recognizing system 100.

Multi-viewpoint video imaging device 111 generates multi-viewpoint video by shooting the same space (S101).

Correspondence between a point in a shooting environment and a point on video and point correspondence between videos are manually or automatically detected, enabling camera calibration in which the orientation of each camera (camera parameter) is estimated (S102).

Three-dimensional space reconstructing device 115 generates a three-dimensional model by performing three-dimensional space reconstruction in which a shooting space is three-dimensionally reconstructed using multi-viewpoint video and camera parameters (S103). For example, a foreground model and a background model are generated as three-dimensional models.

Finally, three-dimensional space recognizing device 116 performs three-dimensional space recognition by using the three-dimensional models (S104). Specifically, three-dimensional space recognizing device 116 performs tracking, scene analysis, and video rendering by using the three-dimensional models.

Figure 4:
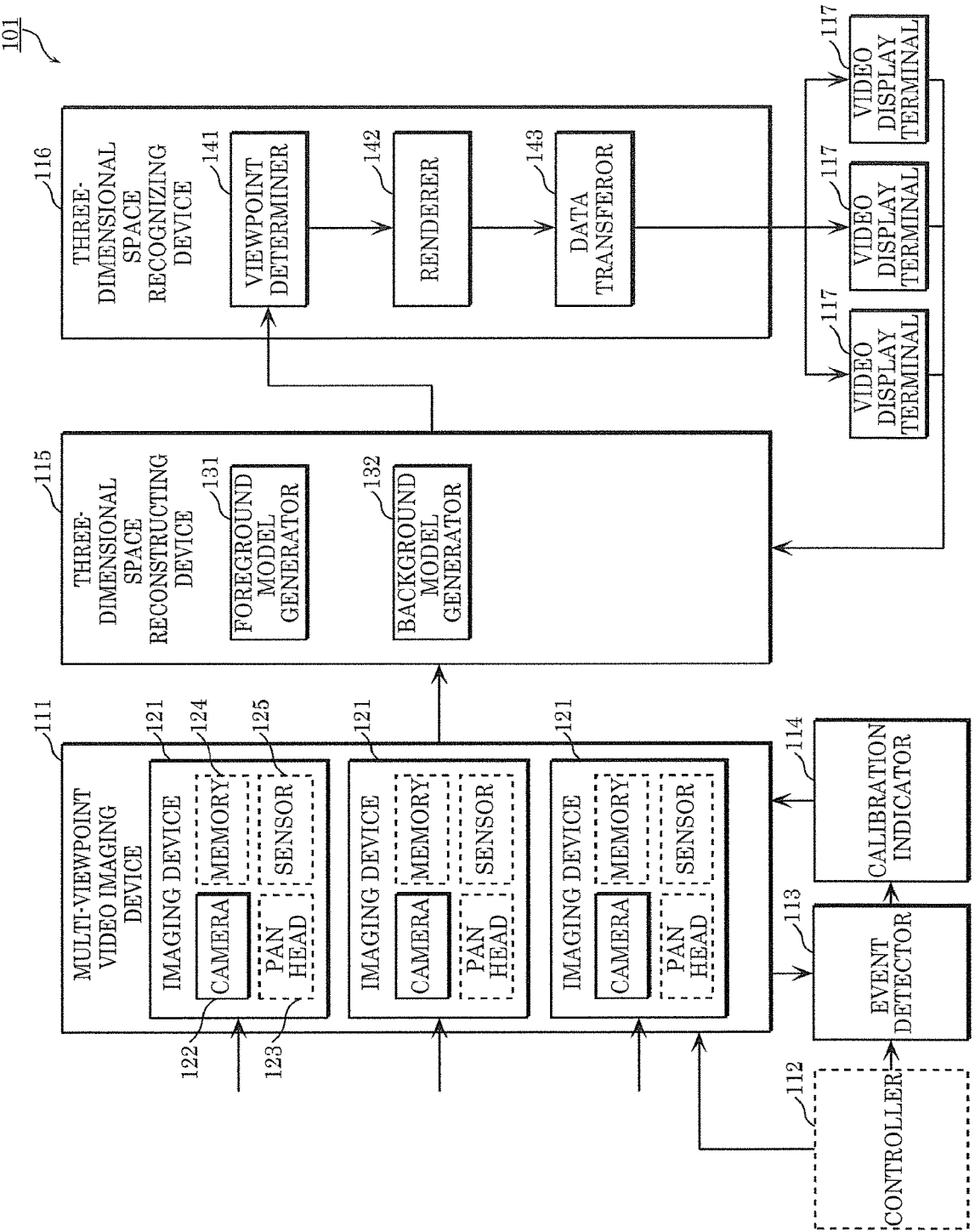
FIG. 4 is a block diagram illustrating the configuration of the free-viewpoint video generating system according to Embodiment 1.

Free-viewpoint video generating system 101 including three-dimensional space recognizing system 100 will be described below. FIG. 4 is a block diagram illustrating free-viewpoint video generating system 101 according to the present embodiment. Free-viewpoint video generating system 101 includes a plurality of video display terminals 117 as user terminals in addition to the configuration of three-dimensional space recognizing system 100. Moreover, three-dimensional space reconstructing device 115 includes foreground model generator 131 and background model generator 132. Three-dimensional space recognizing device 116 includes viewpoint determiner 141, renderer 142, and data transferor 143.

Figure 5:
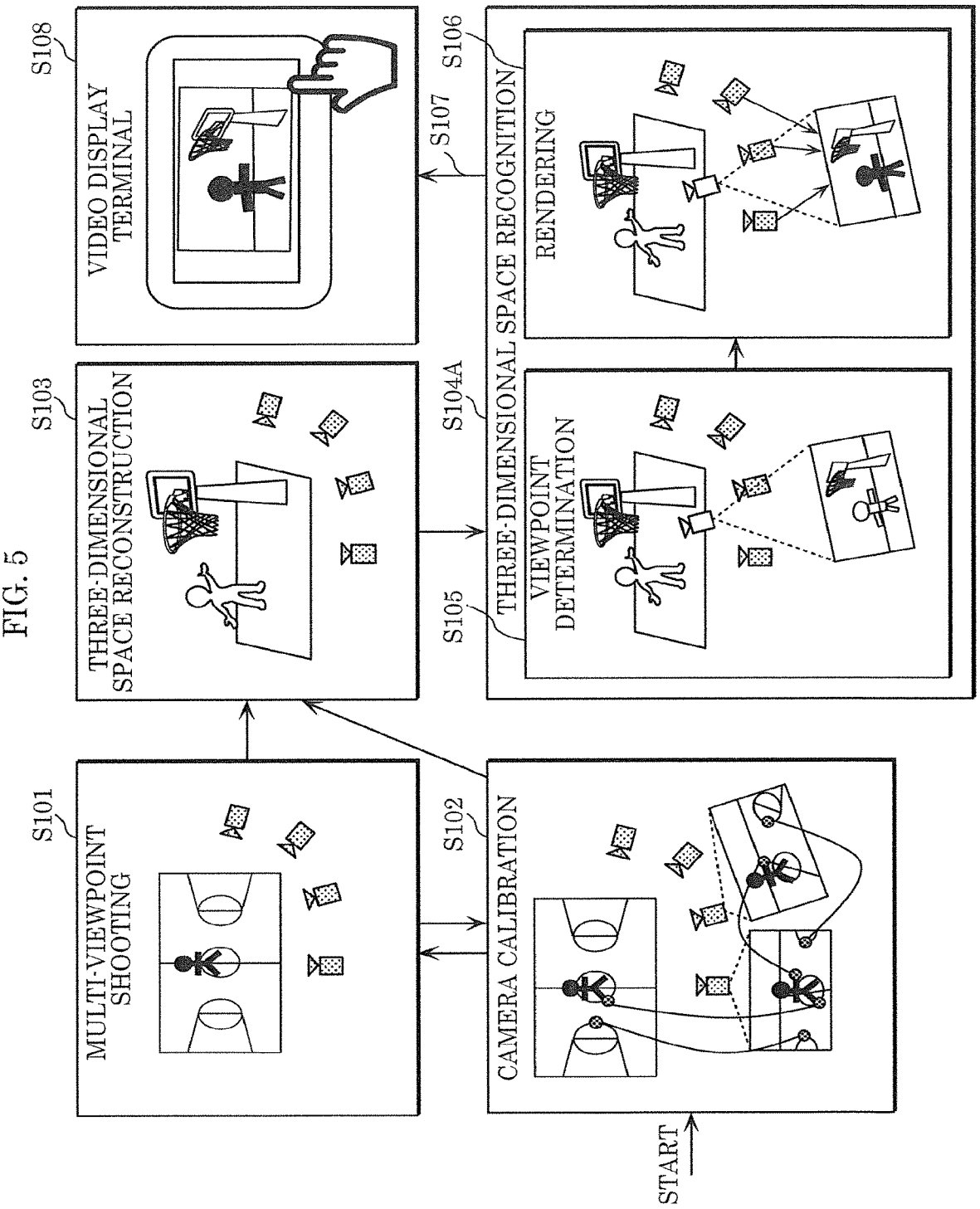
FIG. 5 illustrates the outline of the operations of the free-viewpoint video generating system according to Embodiment 1.
Figure 6:
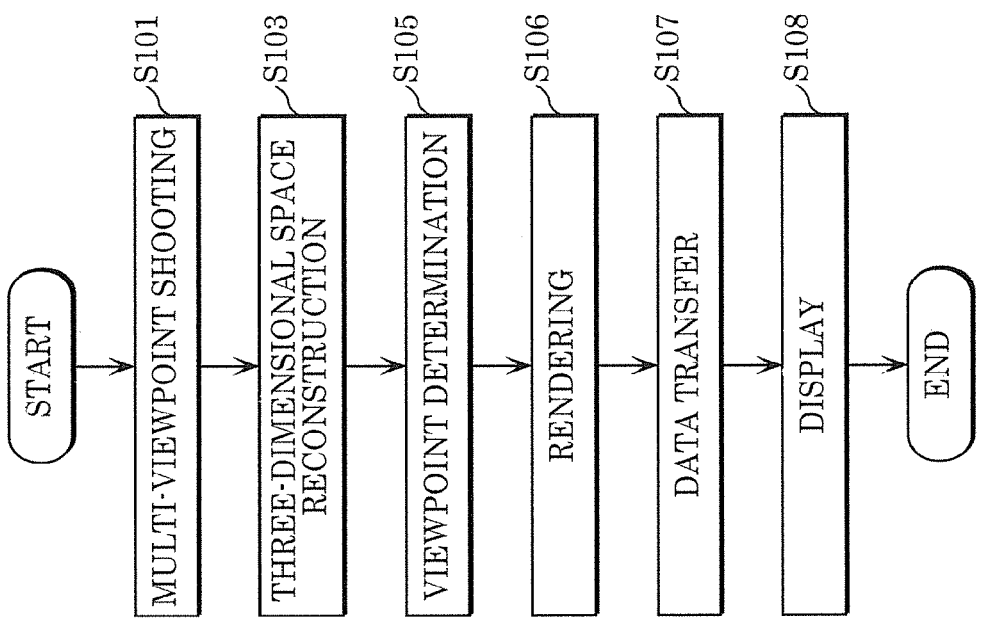
FIG. 6 is a flowchart showing the operations of the free-viewpoint video generating system according to Embodiment 1.

FIG. 5 shows the outline of the operations of free-viewpoint video generating system 101. FIG. 6 is a flowchart showing the operations of free-viewpoint video generating system 101.

First, multi-viewpoint video imaging device 111 generates multi-viewpoint video by performing multi-viewpoint shooting (S101). Multi-viewpoint video imaging device 111 includes multiple imaging devices 121. Imaging device 121 includes camera 122, pan head 123, memory 124, and sensor 125.

In response to a shooting start or a stop signal from controller 112, multi-viewpoint video imaging device 111 starts or stops shooting synchronized among imaging devices 121 according to the signal.

Imaging device 121 records a time stamp at the time of shooting while shooting video by means of camera 122. Moreover, imaging device 121 senses the shooting environment by using sensor 125 (a vibration sensor, an acceleration sensor, a magnetic field sensor, or a microphone) during the shooting and outputs the video, the time stamp, and sensing data to event detector 113.

When receiving calibration indication information from calibration indicator 114, multi-viewpoint video imaging device 111 adjusts imaging device 121 according to the calibration indication information, calibrates camera 122, and outputs a camera parameter obtained by the calibration to event detector 113.

Memory 124 in imaging device 121 temporarily stores video, time stamps, sensing data, and camera parameters or stores shooting settings (including a frame rate and a resolution).

Furthermore, camera calibration is performed at any time (S102). Specifically, event detector 113 detects a calibration event from at least one of video, a time stamp, and sensing information that are obtained from multi-viewpoint video imaging device 111, a three-dimensional model obtained from three-dimensional space reconstructing device 115, free-viewpoint video obtained from renderer 142, terminal information obtained from video display terminal 117, and control information obtained from controller 112, and then event detector 113 outputs calibration event information including the calibration event to calibration indicator 114. The calibration event information includes information indicating the calibration event, the significance of the calibration event, and imaging device 121 to be calibrated.

The calibration event acts as a trigger for calibrating imaging device 121. For example, when a displacement of camera 122 is detected, event detector 113 reaches a predetermined time, the accuracy of camera calibration increases, the accuracy of a model or free-viewpoint video decreases, free-viewpoint video is unnecessary, video from one imaging device 121 is unusable for generating free-viewpoint video, or a system administrator or a user provides an instruction, event detector 113 outputs the calibration event information.

Specifically, event detector 113 detects a displacement of camera 122 when the sensing information exceeds a threshold value, a background region in video is changed by the threshold value or more, or cheers rise. The predetermined time means a time when play is suspended, e.g., in a half time or at the bottom of the fifth inning, a time after the lapse of a certain time from the previous calibration, or the starting time of the system. The time when the accuracy of camera calibration increases means, for example, the time of extraction of at least a certain number of feature points from video. Moreover, event detector 113 determines the deterioration of accuracy in a model or free-viewpoint video according to, for example, the distortion of a wall or a ground in the model or free-viewpoint video.

The time when free-viewpoint video is unnecessary means a time when video display terminals 117 are all unused or when a scene recognized from sound or video is found to be negligible. The time when video from one imaging device 121 is unusable for generating free-viewpoint video means, for example, a time when a sufficient communication band is not obtained and the resolution or frame rate of video decreases, when synchronization is lost, or when an area shot by imaging device 121 does not receive attention because no athlete is shown.

The significance of the calibration event is calculated according to the calibration event or data observed when the calibration event is detected. For example, a displacement of the camera is more significant than other events. Moreover, for example, the larger the displacement of the camera, the higher the level of significance.

Moreover, event detector 113 may transmit the calibration event information to video display terminal 117 and notify a user of imaging device 121 being calibrated.

When receiving the calibration event information from event detector 113, calibration indicator 114 generates calibration indication information based on the calibration event information and outputs the generated calibration indication information to multi-viewpoint video imaging device 111.

The calibration indication information includes cameras 122 to be calibrated, the order of cameras 122 to be calibrated, control information on pan head 123, zoom magnification change information on camera 122, and a calibration method. The control information on pan head 123 indicates, for example, the amount of rotation of pan head 123 for returning camera orientation displaced by vibrations or the like to original orientation. The zoom magnification change information on the camera indicates, for example, a zoom-out amount required for covering the shooting area of camera 122 displaced by vibrations or the like.

The calibration method is a method of associating the three-dimensional coordinates of a specific point, line, or plane with two-dimensional coordinates on video or a method of associating two-dimensional coordinates on a specific point, line, or plane between at least two videos. The coordinates are associated with each other by at least one of a manual operation and an automatic operation. The accuracy of camera calibration may be improved by using a distance between at least two known points, lines, or planes or at least one stereo camera.

Subsequently, three-dimensional space reconstructing device 115 performs three-dimensional space reconstruction by using multi-viewpoint video (S103). Specifically, event detector 113 detects a model generation event from at least one of video, a time stamp, and sensing information that are obtained from multi-viewpoint video imaging device 111, terminal information obtained from video display terminal 117, and control information obtained from the controller, and then event detector 113 outputs model generation information including the model generation event to three-dimensional space reconstructing device 115.

The model generation information includes a model generation event and imaging device information. The imaging device information includes video, a background image, a camera parameter, the reliability of the camera parameter, and the calibration state of the camera. The model generation event is a trigger for generating the three-dimensional model of a shooting environment. Specifically, event detector 113 outputs the model generation information during the calibration of at least a certain number of cameras, at a predetermined time, or when free-viewpoint video is necessary.

The predetermined time is, for example, the time of a play or a time after the lapse of a certain time from previous model generation. A time when free-viewpoint video is necessary is, for example, when video display terminal 117 is used, when a scene recognized from sound or video is found to be significant, or when an instruction is provided from a system administrator or a viewing request is made from a user. The reliability of the camera parameter is determined by the result of camera calibration, the time of camera calibration, video, or sensing information. For example, the lower the reprojection error during camera calibration, the higher the reliability. The camera calibrated immediately before has higher reliability. The larger the number of feature points, the higher the reliability of the calibrated camera.

Three-dimensional space reconstructing device 115 generates the three-dimensional model of the shooting environment by using the model generation information obtained from event detector 113, and stores the generated three-dimensional model. According to the calibration state of the camera and the reliability of the camera parameter, three-dimensional space reconstructing device 115 during the model generation preferentially uses video shot by the calibrated reliable camera. Moreover, three-dimensional space reconstructing device 115 outputs model generation completion information to event detector 113 when the generation of the three-dimensional model of the shooting environment is completed.

When three-dimensional space recognizing device 116 acting as a free-viewpoint video generating device generates free-viewpoint video, three-dimensional space reconstructing device 115 outputs the three-dimensional model of the shooting environment to renderer 142.

Foreground model generator 131 generates a foreground model that is a model of a foreground making a motion change (large change) at each time. The foreground is, for example, a person or a ball. Background model generator 132 generates a background model that is a model of a background making no motion change (small change) at each time. The background is, for example, a venue or a goal. Hereinafter, a three-dimensional model means a model including a foreground model and a background model.

Foreground model generator 131 generates a foreground model according to a frame rate recorded by imaging device 121. For example, if the recorded frame rate is 30 frames per second, foreground model generator 131 generates a foreground model every 1/30 seconds.

Background model generator 132 generates a background model by using a background image not including a foreground, for example, a person or a ball that makes a motion change at each time. Background model generator 132 may reuse the generated background model in a certain period of time. Alternatively, background model generator 132 may generate another background model after a certain period of time and update the background model. This can reduce a throughput for generating a background model making only a few motions, thereby reducing a CPU usage and the amount of memory.

Figure 7:
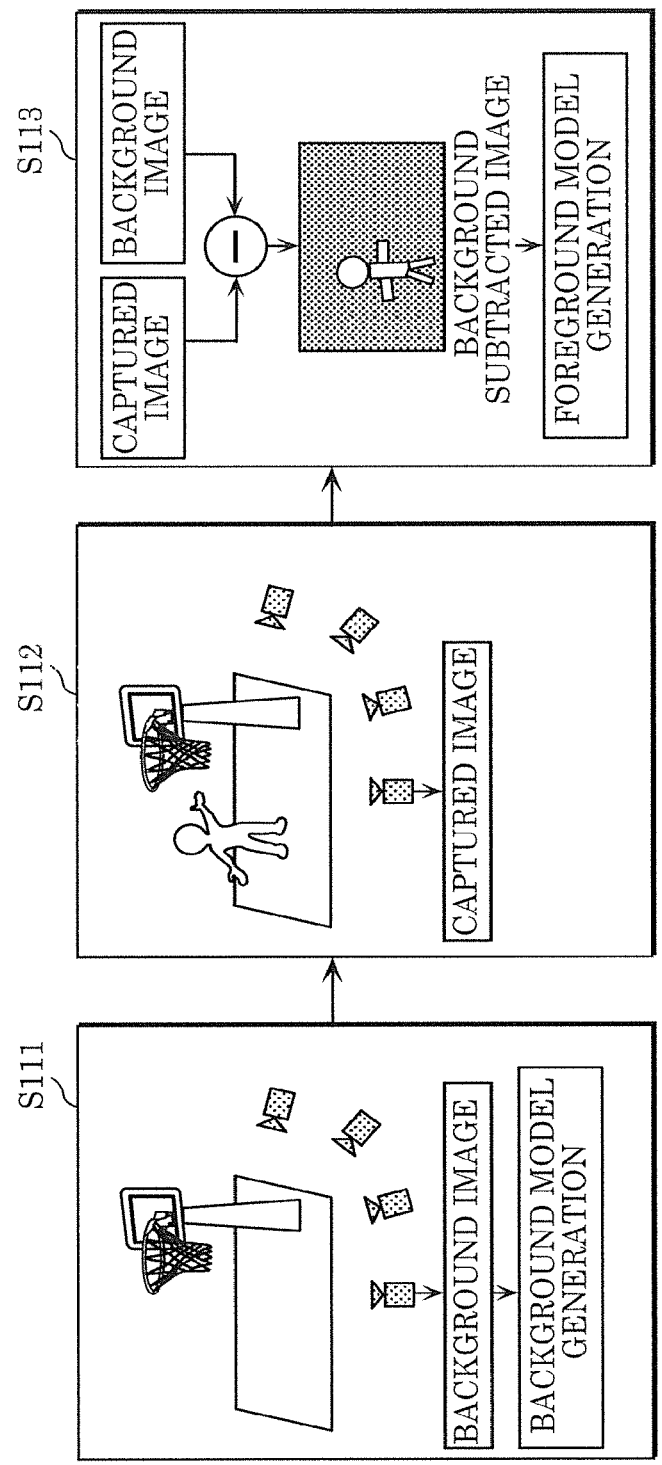
FIG. 7 illustrates a method of generating a foreground model according to Embodiment 1.

A method of generating the background model and the foreground model will be discussed below. FIG. 7 is an explanatory drawing of the processing.

First, background model generator 132 generates the background model (S111). For example, imaging devices 121 included in multi-viewpoint video imaging device 111 generate background images by shooting a background and then record the background images. Background model generator 132 generates the background model by using the background images. As a method of generating the background model, for example, the three-dimensional position of an object included in the background can be specified by calculating, from two or more stereo camera pairs, the depth of each pixel of the object included in a background image as in a multi-view stereo system. Alternatively, background model generator 132 may extract the feature of the background image and specify the three-dimensional position of the feature of the background image from the matching results of features between the cameras based on the principle of triangulation. Any method may be used as long as the three-dimensional model of an object included in a background is calculated.

The background model may be partially or entirely generated by a manual operation. For example, for an object such as a goal having a predetermined shape, a three-dimensional model may be generated in advance by CG or the like. In other words, background model generator 132 may obtain a predetermined background model.

Moreover, background model generator 132 may generate a background image by using captured images including foregrounds and backgrounds. For example, background model generator 132 may calculate the background image by using the mean value image of the captured images. Thus, even if a background image not including a foreground cannot be captured in advance, a background image can be generated, enabling the generation of a background model.

Subsequently, imaging devices 121 included in multi-viewpoint video imaging device 111 generate captured images by shooting a person (foreground) and a background and record the captured images (S112).

After that, foreground model generator 131 generates a foreground model (S113). Specifically, foreground model generator 131 generates a background subtracted image by subtracting a background image from an image captured from the same viewpoint by the same imaging device 121. Foreground model generator 131 generates the foreground model by using the background subtracted images of multiple viewpoints. The foreground model can be generated by a method of specifying the three-dimensional model of a foreground object in a space by using multiple background subtracted images as in a visual hull method. Alternatively, foreground model generator 131 may extract the feature of the foreground image (background subtracted image) and specify the three-dimensional position of the feature of the foreground image from the matching results of features between the cameras based on the principle of triangulation. Any method may be used as long as the three-dimensional model of an object included in a foreground is calculated.

In this way, the foreground model and the background model are generated.

After that, three-dimensional space recognition is performed using the three-dimensional model (S104A). First, viewpoint determiner 141 determines a virtual viewpoint (S105).

Specifically, event detector 113 detects model generation completion information obtained from three-dimensional space reconstructing device 115, terminal information obtained from video display terminal 117, and a free-viewpoint generation event from control information obtained from controller 112, and then event detector 113 outputs free-viewpoint information including the free-viewpoint generation event to viewpoint determiner 141.

The free-viewpoint generation information includes a free-viewpoint generation event, a request viewpoint, and imaging device information. The request viewpoint is, for example, a user-requested viewpoint that is obtained from video display terminal 117 or a viewpoint that is obtained from the controller and is specified by a system administrator. The viewpoint may be a point or a line on a three-dimensional space. The free-viewpoint generation event is a trigger for generating the free-viewpoint video of a shooting environment. Specifically, event detector 113 outputs the free-viewpoint information when the three-dimensional model of the shooting environment is generated, a user requests viewing or distribution of free-viewpoint video at a time when the generated three-dimensional model is present, or a system administrator provides an instruction for the viewing or distribution of the free-viewpoint video.

Viewpoint determiner 141 determines a viewpoint for the generation of free-viewpoint video based on the free-viewpoint information obtained from event detector 113, and then outputs the viewpoint as viewpoint information to renderer 142 along with the free-viewpoint information. Viewpoint determiner 141 determines the viewpoint based on a requested viewpoint. When any viewpoint is not requested, viewpoint determiner 141 may automatically detect a viewpoint from video so as to provide a front view of an athlete or automatically detect a viewpoint near calibrated reliable imaging device 121 according to the reliability of the camera parameter or the calibration state of the camera.

When the virtual viewpoint is set, the structure of a shooting environment viewed from the virtual viewpoint and distance information are determined based on the three-dimensional model (including the foreground model and the background model). Renderer 142 performs rendering using the three-dimensional model, thereby generating free-viewpoint video that is video viewed from the virtual viewpoint (S106).

Specifically, renderer 142 generates viewpoint video according to the viewpoint information and the free-viewpoint information that are obtained from viewpoint determiner 141 and the three-dimensional model of the shooting environment, the three-dimensional model being obtained from three-dimensional space reconstructing device 115. Renderer 142 then outputs the generated video as free-viewpoint video to data transferor 143.

In other words, renderer 142 generates the free-viewpoint video by projecting the three-dimensional model at a virtual viewpoint position indicated by the viewpoint information. At this point, renderer 142 preferentially acquires, for example, video color and texture information from, for example, video obtained by imaging device 121 close to the virtual viewpoint position. However, if imaging device 121 close to the virtual viewpoint position is being calibrated or the camera parameter has low reliability, renderer 142 may preferentially acquire color information from the video of imaging device 121 other than imaging device 121 close to the virtual viewpoint position. Moreover, if imaging device 121 close to the virtual viewpoint position is being calibrated or the camera parameter has low reliability, renderer 142 may reduce the noticeability of deteriorated image quality to a user by blurring video or increasing a reproduction speed. In this way, it is not always necessary that renderer 142 preferentially acquires the video of imaging device 121 close to the virtual viewpoint position. Colors and textures on video may be acquired by any method. Alternatively, color information may be added to the three-dimensional model in advance.

Subsequently, data transferor 143 distributes the free-viewpoint video obtained from renderer 142 to video display terminal 117 (S107). Data transferor 143 may distribute different free-viewpoint videos to respective video display terminals 117 based on a viewpoint requested by each user or may distribute, to video display terminals 117, the same free-viewpoint video generated based on a viewpoint specified by a system administrator or a viewpoint automatically determined by viewpoint determiner 141. Furthermore, data transferor 143 may compress the free-viewpoint video and distribute the compressed free-viewpoint video.

After that, video display terminal 117 displays the distributed free-viewpoint video (S108). In this configuration, video display terminal 117 includes a display, a radio, and a user input interface. The user transmits, to event detector 113 through video display terminal 117, a viewing request for viewing any region from any viewpoint at any time in a shooting environment. Video display terminal 117 receives the free-viewpoint video based on the viewing request from data transferor 143 and shows the free-viewpoint video to the user.

Moreover, video display terminal 117 receives the calibration event information obtained from event detector 113 and highlights the camera being calibrated on the display. This can notify the user that free-viewpoint video cannot be generated from a viewpoint near the imaging device or image quality may deteriorate.

The system administrator transmits a shooting start or stop signal from controller 112 to multi-viewpoint video imaging device 111 and causes multi-viewpoint video imaging device 111 to start or stop synchronous shooting.

If it is determined that camera calibration is necessary, the system administrator transmits the control information from controller 112 to event detector 113, enabling calibration of any camera.

If it is determined that the three-dimensional model of the shooting environment is necessary, the system administrator transmits the control information from controller 112 to event detector 113, enabling the generation of the three-dimensional model of the shooting environment at any time by means of any imaging device 121.

If it is determined that free-viewpoint video is necessary, the system administrator transmits the control information from controller 112 to event detector 113, so that free-viewpoint video at any time can be generated and distributed to video display terminal 117.

Embodiment 2

The function of generating free-viewpoint video may be used by a monitoring system. In this case, the estimated appearance of a suspect is viewed from a viewpoint having not been captured by an actual camera and can be shown to a security guard.

Figure 8:
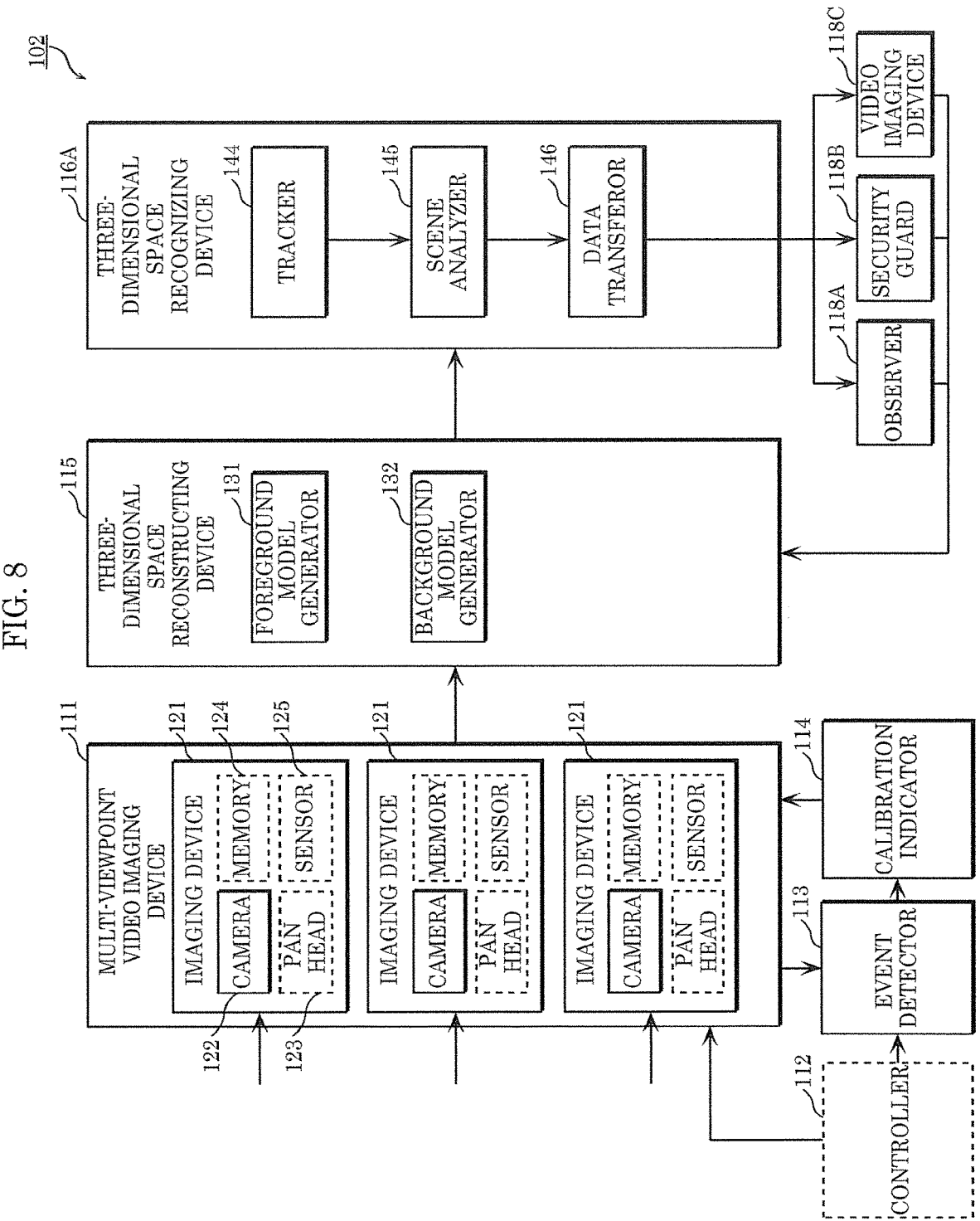
FIG. 8 is a block diagram illustrating the configuration of a next-generation monitoring system according to Embodiment 2.

FIG. 8 is a block diagram illustrating the configuration of next-generation monitoring system 102 according to the present embodiment. The configuration of three-dimensional space recognizing device 116A in next-generation monitoring system 102 in FIG. 8 is different from that of three-dimensional space recognizing device 116 in free-viewpoint video generating system 101 in FIG. 4. Moreover, next-generation monitoring system 102 includes observer 118A, security guard 118B, and video imaging device 118C instead of video display terminals 117.

Three-dimensional space recognizing device 116A includes tracker 144, scene analyzer 145, and data transferor 146.

Figure 9:
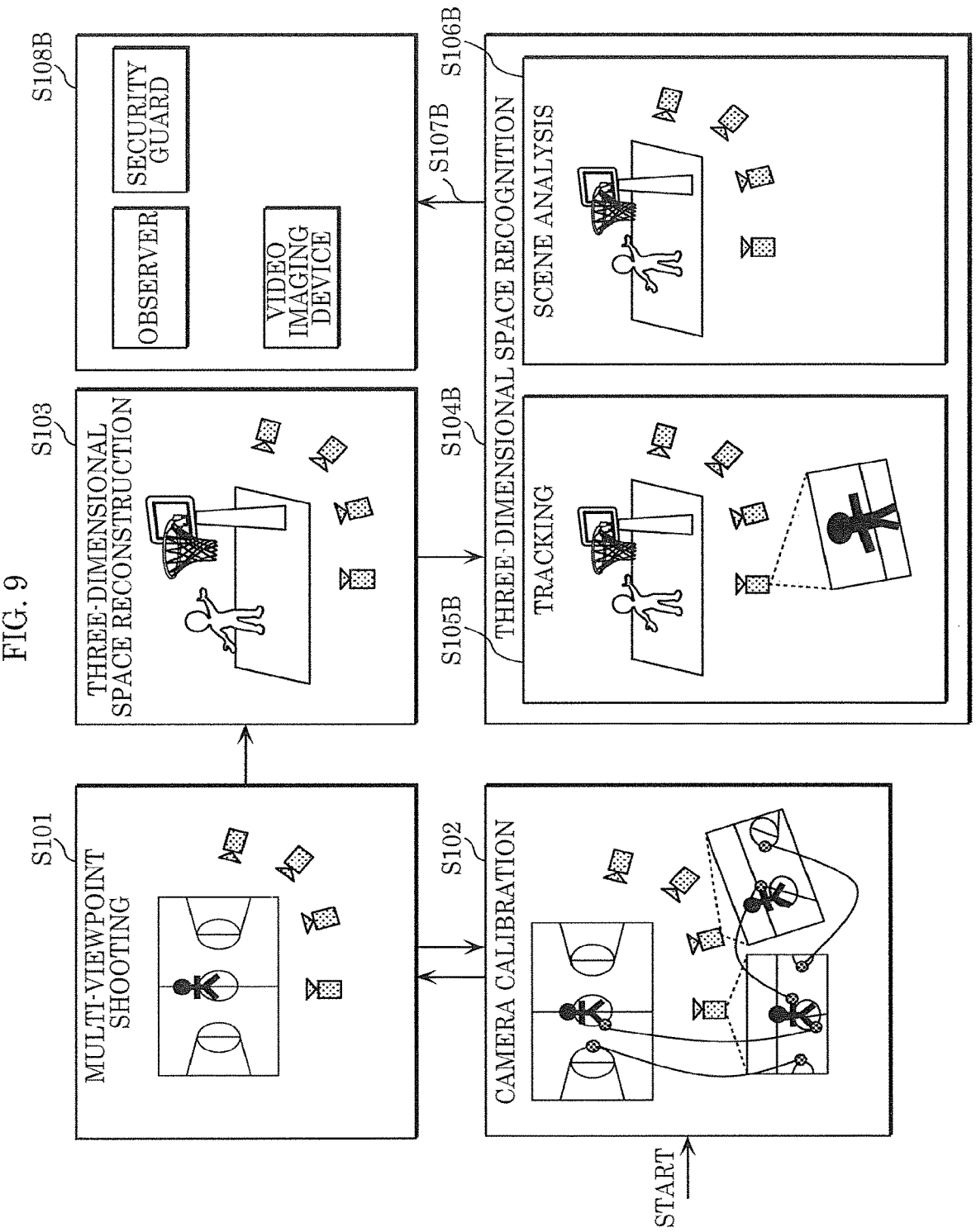
FIG. 9 illustrates the outline of the operations of the next-generation monitoring system according to Embodiment 2.
Figure 10:
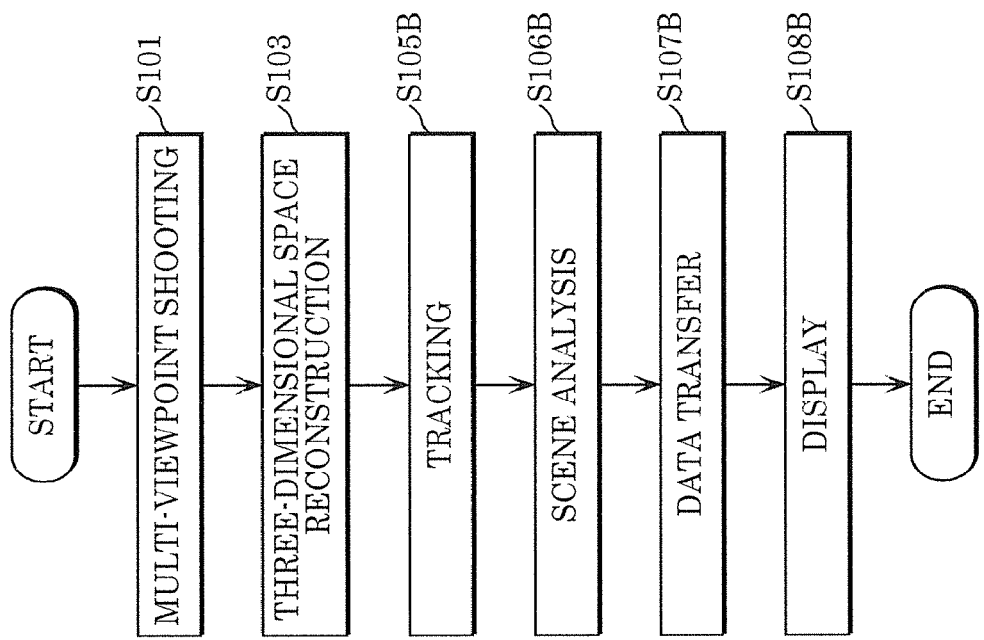
FIG. 10 is a flowchart showing the operations of the next-generation monitoring system according to Embodiment 2.

FIG. 9 illustrates the outline of the operations of next-generation monitoring system 102. FIG. 10 is a flowchart showing the operations of next-generation monitoring system 102. Multi-viewpoint shooting (S101), camera calibration (S102), and three-dimensional space reconstruction (S103) are similar to those of FIGS. 5 and 6.

Subsequently, three-dimensional space recognizing device 116A performs three-dimensional space recognition by using three-dimensional models (S104B). Specifically, tracker 144 tracks a person on a three-dimensional space (S105B). Furthermore, tracker 144 automatically extracts video including the person.

Scene analyzer 145 analyzes a scene (S106B). Specifically, scene analyzer 145 recognizes the state of the person or the scene and detects an abnormality from the three-dimensional space or multi-viewpoint video.

Data transferor 146 then transfers the result of three-dimensional space recognition to the terminals of observer 118A or security guard 118B or video imaging device 118C (S107B). Moreover, the result of three-dimensional space recognition is displayed on the terminal of observer 118A or security guard 118B or the display of video imaging device 118C (S108B).

The detail of the operations will be discussed below. As in the generation of free-viewpoint video, scene analyzer 145 and tracker 144 calculate the structure of each subject viewed from a virtual viewpoint in a shooting area and a distance from the virtual viewpoint based on a three-dimensional model generated by three-dimensional space reconstructing device 115. Furthermore, scene analyzer 145 and tracker 144 can preferentially acquire the color and texture of each subject from the video of imaging device 121 close to the virtual viewpoint and use the acquired information.

In scene analysis using two-dimensional video, video showing a state of each subject, e.g., a person or an object in a shooting area at a moment is analyzed by software or visual observation on a screen. The scene analysis is performed by scene analyzer 145 based on three-dimensional model data, enabling the observation of the three-dimensional posture of a person or the three-dimensional shape of an object in a shooting area. Thus, a state can be recognized and predicted with higher accuracy than in the use of two-dimensional video.

In tracking using two-dimensional video, for example, a subject in a shooting area is first identified by scene analysis on video captured by imaging device 121. Moreover, the same subject identified on video captured at a different moment by imaging device 121 is matched by software or a manual operation. Tracking is performed by the identification and matching of the subject along a time axis. However, in two-dimensional video or the like shot by imaging device 121, a target subject may be temporarily hidden behind another subject and may not be continuously identified. Also in this case, the subject can be continuously identified using three-dimensional position information or three-dimensional shape information on the subject according to the three-dimensional model.

The function of scene analysis and tracking using the three-dimensional model is employed by next-generation monitoring system 102. This can achieve early detection of a suspicious site and more accurate detection. Even if the number of installed cameras is limited at a site, a higher security level can be obtained than in the use of two-dimensional video.

Scene analyzer 145 analyzes data on a three-dimensional model and identifies, for example, a subject. The analysis result may be transferred to tracker 144 or displayed with free-viewpoint video on the display of a terminal or the like. Data on the analysis result of the free-viewpoint video may be stored in a storage device provided in a terminal or the like or in an external storage device. Moreover, according to the analysis result, the determination of a virtual viewpoint at another time or another position by a user may be requested from scene analyzer 145 via a terminal.

Tracker 144 tracks a specific subject based on the data on the three-dimensional model. The tracking result may be displayed with free-viewpoint video on the display of a terminal or the like. For example, if a specific subject cannot be tracked, the determination of a virtual viewpoint at another time or another position by a user may be requested from tracker 144 via a terminal.

Embodiment 3

Figure 11:
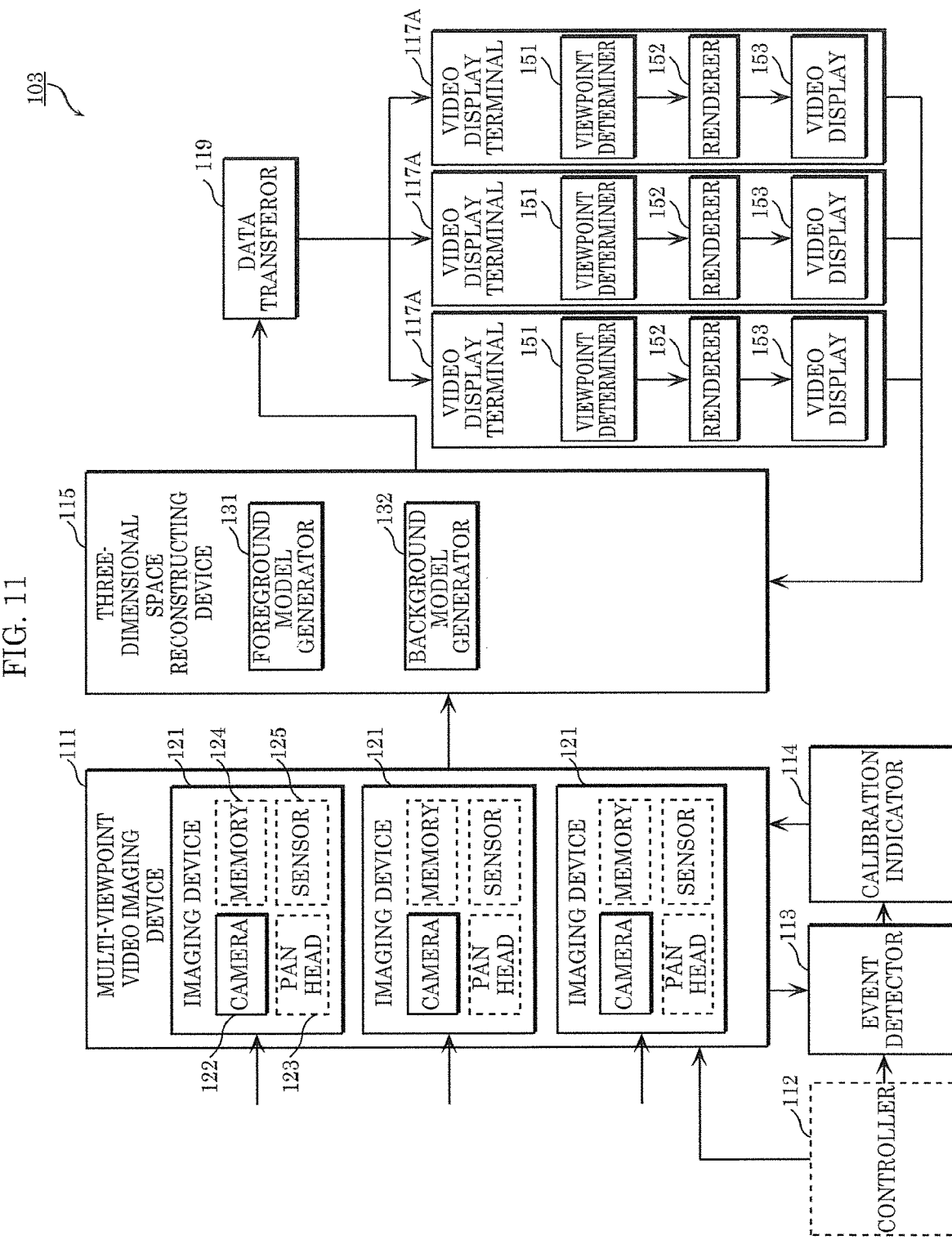
FIG. 11 is a block diagram illustrating the configuration of a free-viewpoint video generating system according to Embodiment 3.

In the present embodiment, a modification of free-viewpoint video generating system 101 according to Embodiment 1 will be described. FIG. 11 is a block diagram illustrating the configuration of free-viewpoint video generating system 103 according to the present embodiment. Free-viewpoint video generating system 103 in FIG. 11 is different from free-viewpoint video generating system 101 in FIG. 4 in that viewpoint determiner 151 and renderer 152 are provided in video display terminal 117A.

Data transferor 119 distributes a three-dimensional model (a foreground model and a background model) generated by three-dimensional space reconstructing device 115 to video display terminal 117A. Moreover, data transferor 119 may transmit video captured by multi-viewpoint video imaging device 111 and a camera parameter to video display terminal 117A. During the generation of a three-dimensional model, three-dimensional space reconstructing device 115 may add color information to the three-dimensional model by using captured video or the like and data transferor 119 may distribute the three-dimensional model with the added color information to video display terminal 117A. In this case, data transferor 119 may not distribute captured video to video display terminal 117A.

Video display terminal 117A includes a display, a radio, and a user input interface. A user uses video display terminal 117A and transmits, to event detector 113, a viewing request for viewing any region at any time in a shooting environment. Moreover, the user receives a three-dimensional model, captured video, and a camera parameter from data transferor 119 based on the viewing request. By using viewpoint information specified by the user and the received three-dimensional model, video display terminal 117A generates video at a viewpoint corresponding to the viewpoint information and outputs the generated video as free-viewpoint video to a display.

Figure 12:
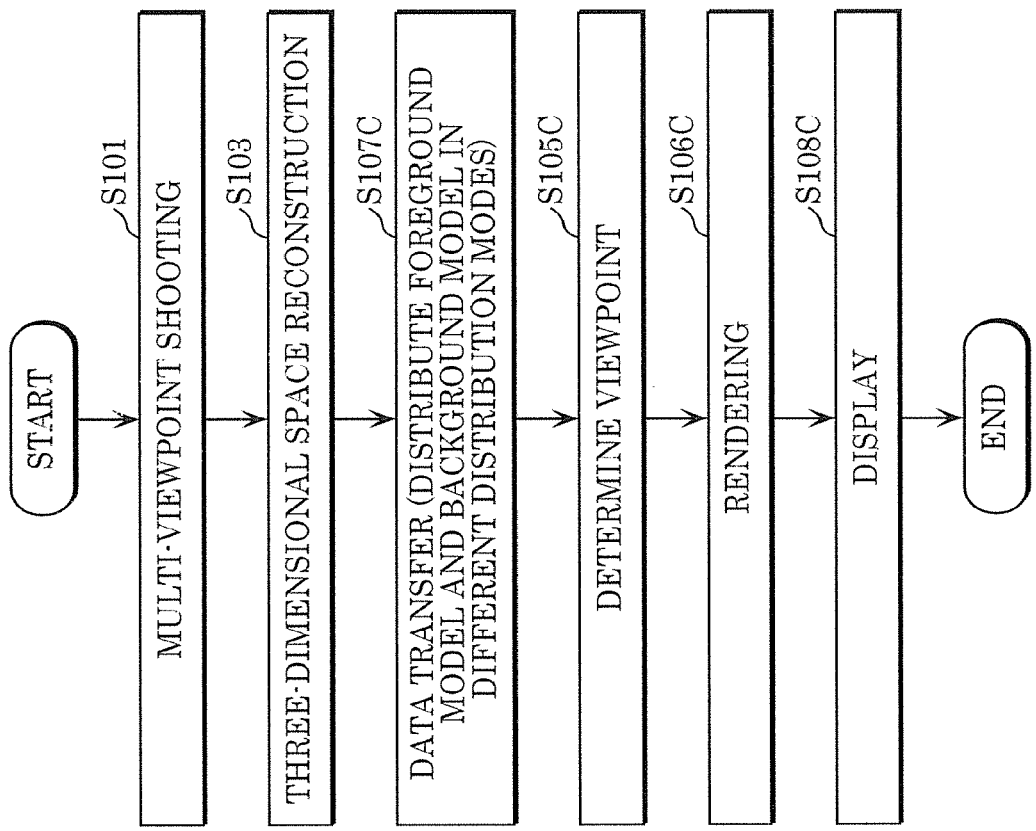
FIG. 12 is a flowchart showing the operations of the free-viewpoint video generating system according to Embodiment 3.

FIG. 12 is a flowchart showing the operations of free-viewpoint video generating system 103. Steps S101 and S103 are similar to processing in Embodiment 1 illustrated in FIG. 6.

Subsequently, data transferor 119 distributes a three-dimensional model (a foreground model and a background model) generated by three-dimensional space reconstructing device 115 to video display terminal 117A (S107C). At this point, data transferor 119 distributes the foreground model and the background model in different distribution modes.

For example, when the three-dimensional model is distributed to video display terminal 117A, data transferor 119 separately distributes the foreground model and the background model. At this point, data transferor 119 adds, for example, a flag or an identifier for discriminating between the foreground model and the background model, to header information or the like included in distributed data.

For example, the foreground model and the background model may have different distribution periods. The distribution period of the foreground model may be shorter than the distribution period of the background model. If the recorded frame rate of imaging device 121 is, for example, 30 frames per second, data transferor 119 distributes 30 foreground models per second according to the recorded frame rate of imaging device 121. Data transferor 119 distributes, for example, a single model as a background model.

Moreover, during the distribution of the foreground model, data transferor 119 may generate a differential model as a difference between a foreground model at the current time and a foreground model at a previous time, and then data transferor 119 may distribute the generated differential model. Furthermore, data transferor 119 may predict a motion of the foreground model, generate a prediction model from the foreground model at the previous time, generate a differential model as a difference between the foreground model at the current time and the prediction model, and then distribute the generated differential model and motion information indicating the result of motion prediction. This can reduce the amount of information on the foreground model, thereby suppressing the band of a network. Moreover, data transferor 119 may compress the amount of information on transmitted data by performing variable-length coding or arithmetic coding on the differential model and the motion information.

During the distribution of the background model, data transferor 119 may distribute the single background model when a user starts viewing. Alternatively, data transferor 119 may transmit the background model at predetermined regular intervals. At this point, data transferor 119 may generate a differential model as a difference between the current background model and the previously distributed background model, and then transmit the generated differential model. This can reduce the amount of information on the distributed background model, thereby suppressing the network band.

Data transferor 119 may transmit both of the foreground model and the background model at random access points. Thus, video display terminal 117A can always generate free-viewpoint video by using proper foreground and background models when the user switches viewing times.

Figure 13:
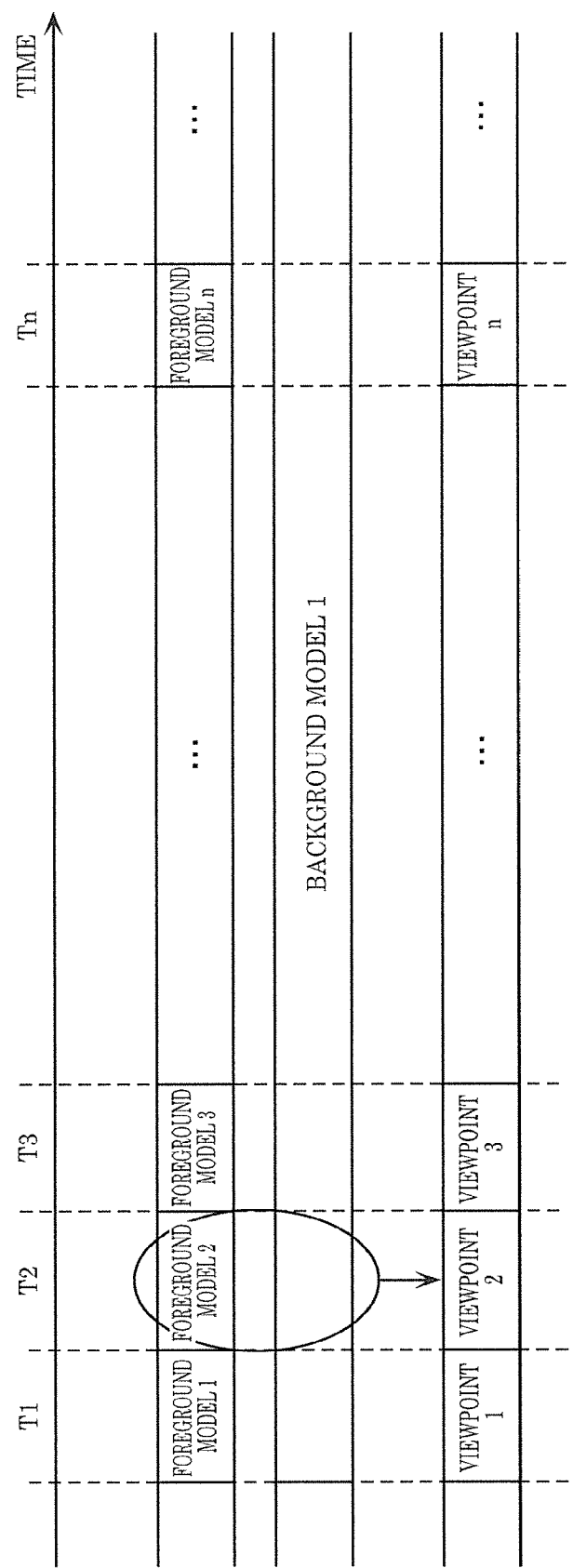
FIG. 13 shows a distribution example of a foreground model and a background model according to Embodiment 3.

FIG. 13 shows a distribution example of foreground models and a background model, the background model being distributed when the user starts viewing. As shown in FIG. 13, data transferor 119 distributes the background model when the user starts viewing. Video display terminal 117A generates free-viewpoint video by using the background model and the foreground model received at each time.

Figure 14:
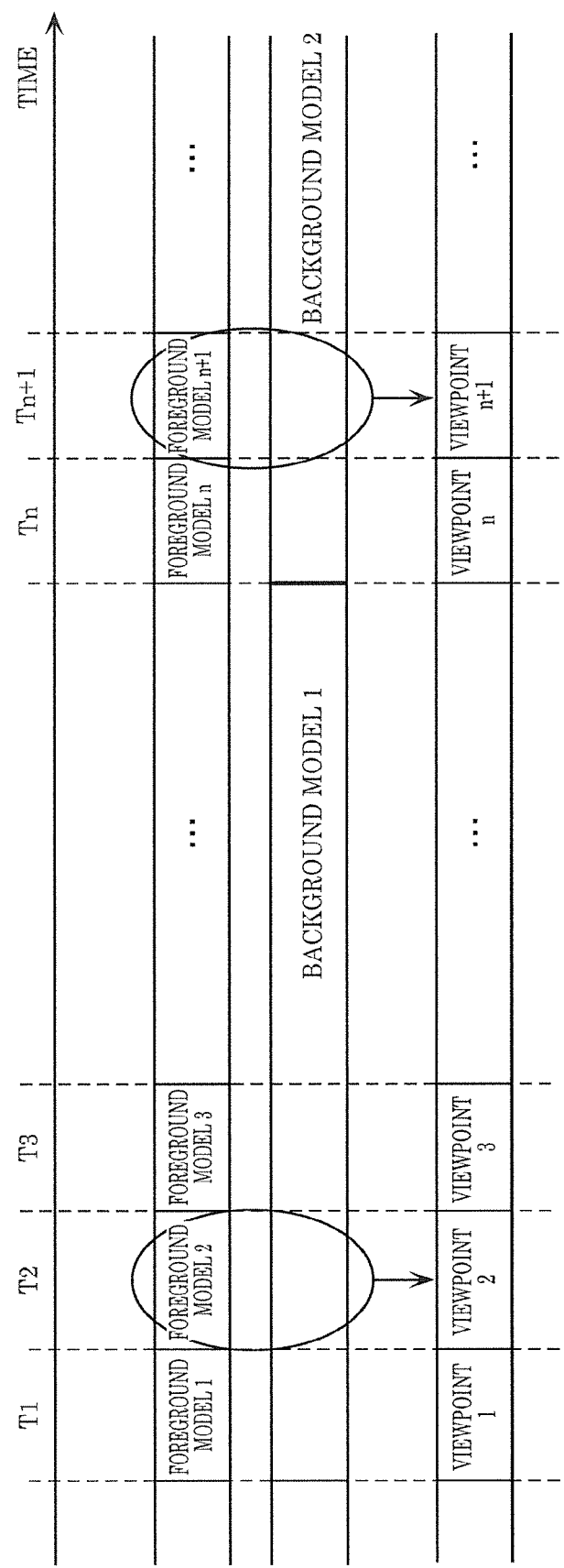
FIG. 14 shows a distribution example of the foreground model and the background model according to Embodiment 3.

FIG. 14 shows a distribution example of foreground models and background models, the background models being distributed at regular intervals. As shown in FIG. 14, data transferor 119 distributes the background models at predetermined regular intervals. In this case, the regular intervals are longer than the intervals for distributing the foreground models. Video display terminal 117A generates free-viewpoint video by using the previously received background model and the foreground model received at each time.

If the foreground models and the background models are encoded and distributed, data transferor 119 may switch an encoding method for each of the models. In other words, data transferor 119 may use different encoding methods for the foreground and background models. For example, for the foreground model, data transferor 119 uses an encoding method in which priority is placed on a low delay in order to perform instant replay on video display terminal 117A. For the background model, data transferor 119 uses an encoding method in which priority is placed on high efficiency in order to minimize the amount of information. Thus, a proper encoding method is selected according to the purpose of each model, thereby improving the functionality of the system while reducing the amount of data.

Data transferor 119 may use a high-efficient encoding method for the foreground model and a less efficient encoding method for the background model. For example, the background model is less frequently distributed and thus the use of the less efficient encoding method hardly increases a network load even when the amount of data increases. The use of the less efficient encoding method with a low throughput can suppress a processing load for the background model on a server or a terminal. The foreground model is frequently updated. Thus, even if the server or the terminal has a high processing load, the foreground model is encoded with maximum efficiency, thereby reducing the network load. Data transferor 119 may transfer the models without encoding according to the less efficient encoding method.

Alternatively, data transferor 119 may distribute the foreground model and the background model by using networks or protocols having different characteristics. For example, for the foreground model, data transferor 119 uses a high-speed network having a low packet loss and high reliability and a low-delay distribution protocol such as UDP (User Datagram Protocol) in order to perform instant replay on video display terminal 117A. For the background model, data transferor 119 uses a low-speed network and a protocol such as TCP (Transmission Control Protocol) having high error resistance in order to securely distribute the background model while obtaining the transmission band of the foreground model. Furthermore, the foreground model may be distributed with low delay by applying download distribution using HTTP (Hypertext Transfer Protocol) to the background model and stream distribution using RTP (Real-time Transport Protocol) to the foreground model.

Data transferor 119 may acquire viewpoint position information from video display terminal 117A during viewing of the user and switch the three-dimensional model to be distributed by using the information. For example, data transferor 119 may preferentially distribute the foreground model and the background model that are necessary for generating video from a viewpoint during viewing of the user. Moreover, data transferor 119 may distribute, with high precision (high density), the foreground model necessary for generating video from a viewpoint during viewing of the user, and distribute the other models with lower model precision (density) by thinning or the like. This can reduce the amount of distributed data. The background models may not be switched in this way.

Furthermore, data transferor 119 may change the density or the distribution period of the three-dimensional model to be distributed according to an available network band. For example, data transferor 119 may reduce the density of the three-dimensional model or increase the distribution period as the network band decreases. Video display terminal 117A may switch the resolution of rendering according to the density of the three-dimensional model distributed by data transferor 119. For example, in the case of a narrow network band, data transferor 119 distributes the three-dimensional model after reducing the density by thinning or the like. Moreover, video display terminal 117A displays video with a reduced rendering resolution.

As a method of reducing the density of the three-dimensional model, thinning may be evenly performed or the enabling and disabling of thinning or thinning methods may be switched depending on a target object. For example, data transferor 119 distributes an important subject with a dense three-dimensional model and distributes other subjects with sparse three-dimensional models. This can reduce the amount of distributed data while keeping the image quality of the important subject. In the case of a narrow network band, data transferor 119 may reduce the temporal resolution of the three-dimensional model to be distributed. For example, the distribution period of the foreground model may be increased.

FIG. 12 will be referred to again. Subsequently, video display terminal 117A performs three-dimensional space recognition by using the distributed three-dimensional model. First, viewpoint determiner 151 determines a virtual viewpoint (S105C). After that, renderer 152 performs rendering using the three-dimensional model, thereby generating free-viewpoint video that is video viewed from the virtual viewpoint (S106C). The processing is similar to that of steps S105 and S106 in Embodiment 1. Subsequently, video display 153 displays the generated free-viewpoint video (S108C).

When receiving the three-dimensional model from data transferor 119, video display terminal 117A may separately receive the foreground model and the background model. At this point, video display terminal 117A may analyze, for example, header information to acquire a flag or an identifier for identifying whether each model is a foreground model or a background model.

The foreground model and the background model may have different reception periods. The reception period of the foreground model may be shorter than that of the background model. If the recorded frame rate of imaging device 121 is, for example, 30 frames per second, video display terminal 117A receives 30 foreground models per second according to the recorded frame rate of imaging device 121. Moreover, video display terminal 117A receives one model as a background model.

During the reception of the foreground model, video display terminal 117A may receive a differential model as a difference between a foreground model at the current time and a foreground model at a previous time, and may generate the foreground model at the current time by adding the foreground model at the previous time and the differential model. Furthermore, video display terminal 117A may receive the differential model and motion information indicating the result of motion prediction, generate a prediction model from the received motion information and the foreground model at the previous time, and add the differential model and the prediction model so as to generate the foreground model at the current time. This can reduce the amount of information on the foreground model to be received, thereby suppressing the band of the network. If the differential model and the motion information are compressed by variable-length coding or arithmetic coding, video display terminal 117A may decode the differential model and the motion information by performing variable-length decoding or arithmetic decoding.

During the reception of the background model, video display terminal 117A may receive the single background model when the user starts viewing, and the background model may be used at all times. Alternatively, video display terminal 117A may receive the background model at predetermined regular intervals. At this point, video display terminal 117 receives a differential model as a difference between a previously received background model and a current background model and may generate the current background model by adding the previous background model and the differential model. This can reduce the amount of information on the received background model, thereby suppressing the network band.

Video display terminal 117A may receive both of the foreground model and the background model at random access points. Thus, video display terminal 117A can always generate free-viewpoint video by using proper foreground and background models when the user switches viewing times.

If the three-dimensional model cannot be received by a network error or the like, video display terminal 117A may perform rendering by using a received three-dimensional model. For example, if the foreground model cannot be received, video display terminal 117A may generate a prediction model by predicting a motion from the received foreground model and use the generated prediction model as a foreground model at the current time. If the background model cannot be received, video display terminal 117A may use the received background model or a CG model. If the background model or the foreground model cannot be received, video display terminal 117A may use a prepared model or rendering image, e.g., a CG image. Thus, even if the three-dimensional model cannot be received, video display terminal 117A can provide a rendering image for the user.

Data transferor 119 may distribute, to video display terminal 117A, at least one of a camera parameter, captured video, a background image, and a background subtracted image that are obtained by multi-viewpoint video imaging device 111, time information during the generation of each shot video or a three-dimensional model, viewpoint position information at the start of rendering, and time information for rendering.

If imaging device 121 is a stationary camera, data transferor 119 may distribute the camera parameter to video display terminal 117A only at the start of viewing. Alternatively, data transferor 119 may distribute the camera parameter to video display terminal 117A when calibration is performed by calibration indicator 114. If imaging device 121 is not stationary, data transferor 119 may distribute the camera parameter to video display terminal 117A each time the camera parameter is updated.

Moreover, data transferor 119 may encode and distribute shot video, a background image, or a background subtracted image that are obtained by multi-viewpoint video imaging device 111. This can reduce the amount of transmitted data. For example, data transferor 119 may use a multi-view codec (MVC) based on H.264 or H.265 according to a correlation between multi-viewpoint images. Alternatively, data transferor 119 may separately encode and distribute the videos of imaging devices 121 based on H.264 or H.265. This can reduce the amount of data distributed to video display terminal 117A.

The viewpoint position information at the start of rendering may be specified by the user through video display terminal 117A upon startup. Viewpoint determiner 151 may change a viewpoint position depending on the style of viewing through video display terminal 117A or the kind of video display terminal 117A. For example, in the case of viewing on television, viewpoint determiner 151 determines, as a starting viewpoint, a viewpoint recommended by the system, a viewpoint from imaging device 121 close to a ball, a viewpoint from imaging device 121 that shots the center of a field, or a viewpoint where a high rating is obtained. In the case of viewing on a personal terminal, e.g., a user's tablet or smartphone, viewpoint determiner 151 determines a viewpoint for viewing of a user's favorite player as a starting viewpoint. In the case of viewing on a head mounted display, viewpoint determiner 151 determines a recommended viewpoint for VR (Virtual Reality), e.g., an athlete's viewpoint on a field or a viewpoint from a bench as a starting viewpoint.

Embodiment 4

Figure 15:
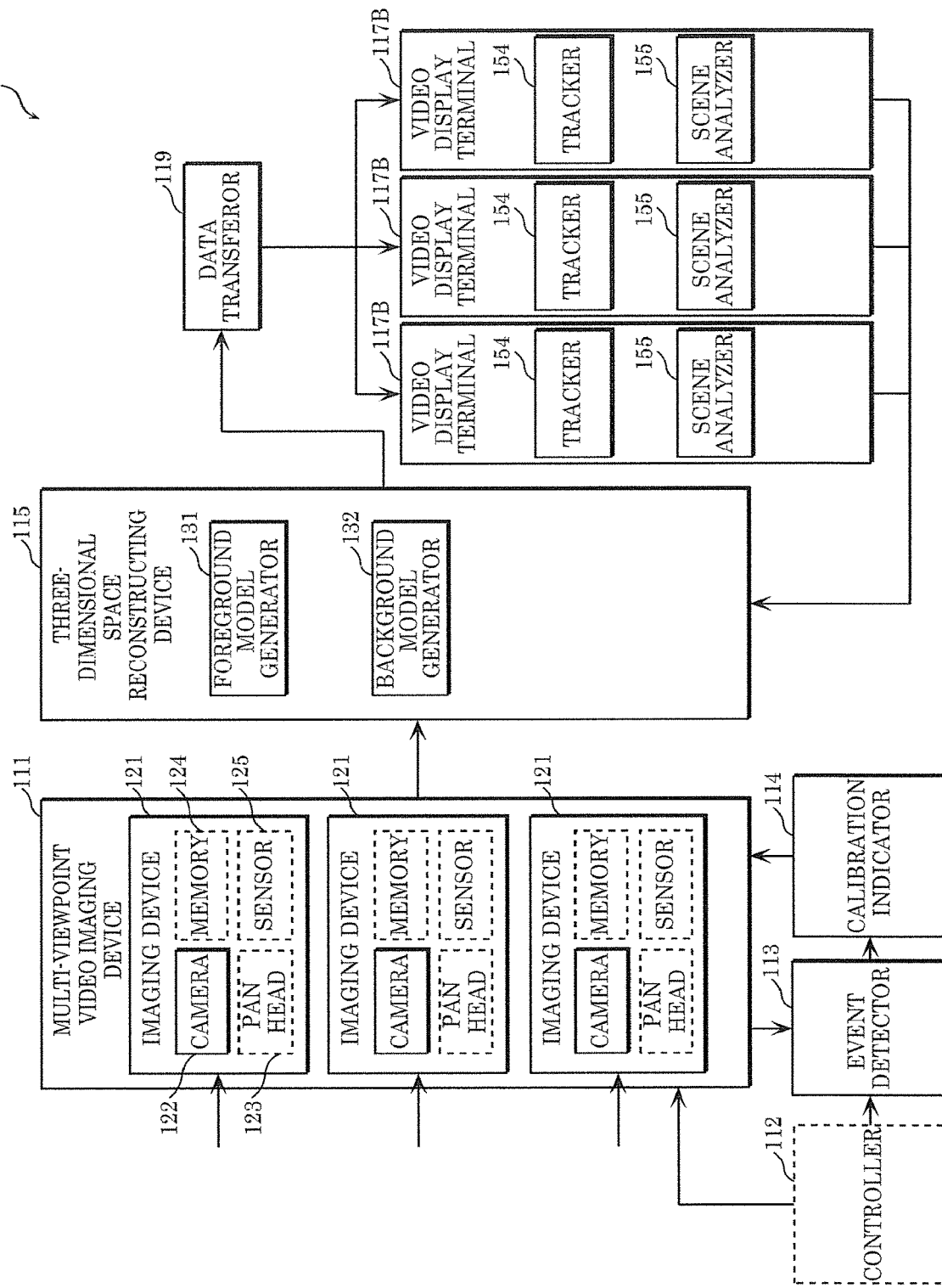
FIG. 15 is a block diagram illustrating the configuration of a next-generation monitoring system according to Embodiment 4.

In the present embodiment, a modification of next-generation monitoring system 102 according to Embodiment 2 will be described. FIG. 15 is a block diagram illustrating the configuration of next-generation monitoring system 104 according to the present embodiment. Next-generation monitoring system 104 in FIG. 15 is different from next-generation monitoring system 102 in FIG. 8 in that tracker 154 and scene analyzer 155 are provided in video display terminal 117B.

Figure 16:
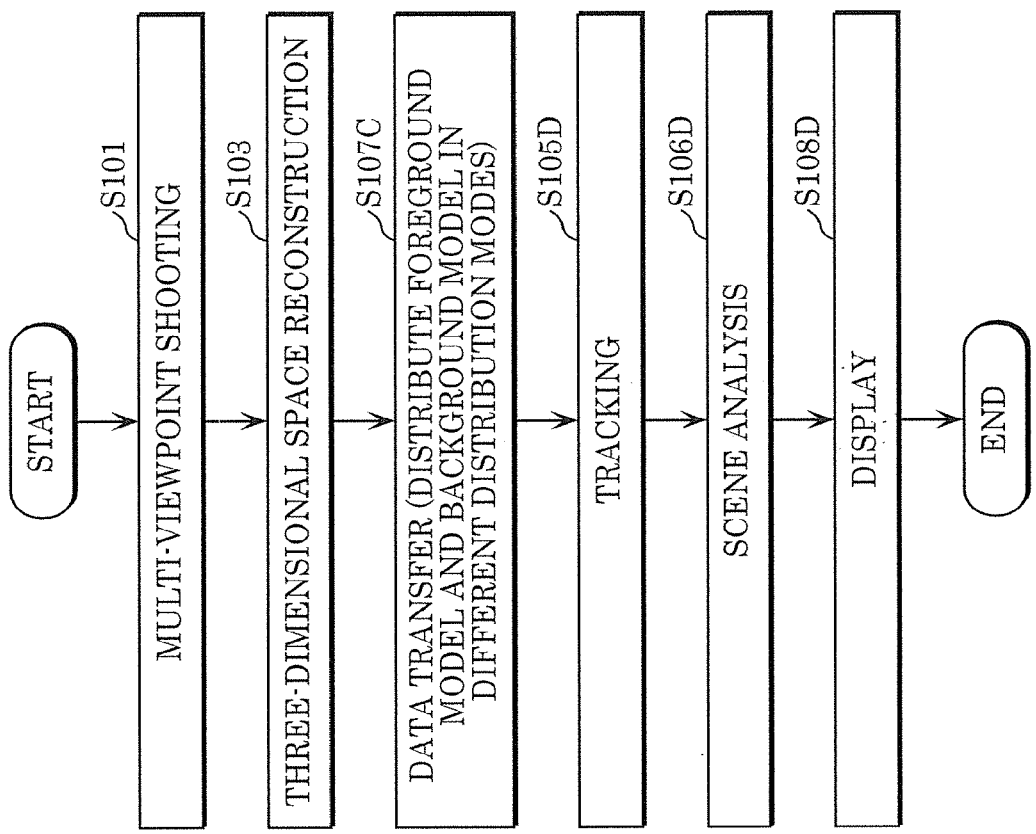
FIG. 16 is a flowchart showing the operations of the next-generation monitoring system according to Embodiment 4.

FIG. 16 is a flowchart showing the operations of next-generation monitoring system 104. Steps S101, S103, and S107C are similar to processing in Embodiment 3 illustrated in FIG. 12.

Subsequently, video display terminal 117B performs three-dimensional space recognition by using a three-dimensional model. Specifically, tracker 154 tracks a person on a three-dimensional space (S105D). Scene analyzer 155 analyzes a scene (S106D). Video display terminal 117B displays the result of three-dimensional space recognition (S108D). The processing is similar to that of steps S105B, S106B, and S108B in Embodiment 2.

Embodiment 5

The foregoing embodiments described examples in which the foreground model and the background model are included in the three-dimensional model. Models included in the three-dimensional model are not limited to the foreground model and the background model.

Figure 17:
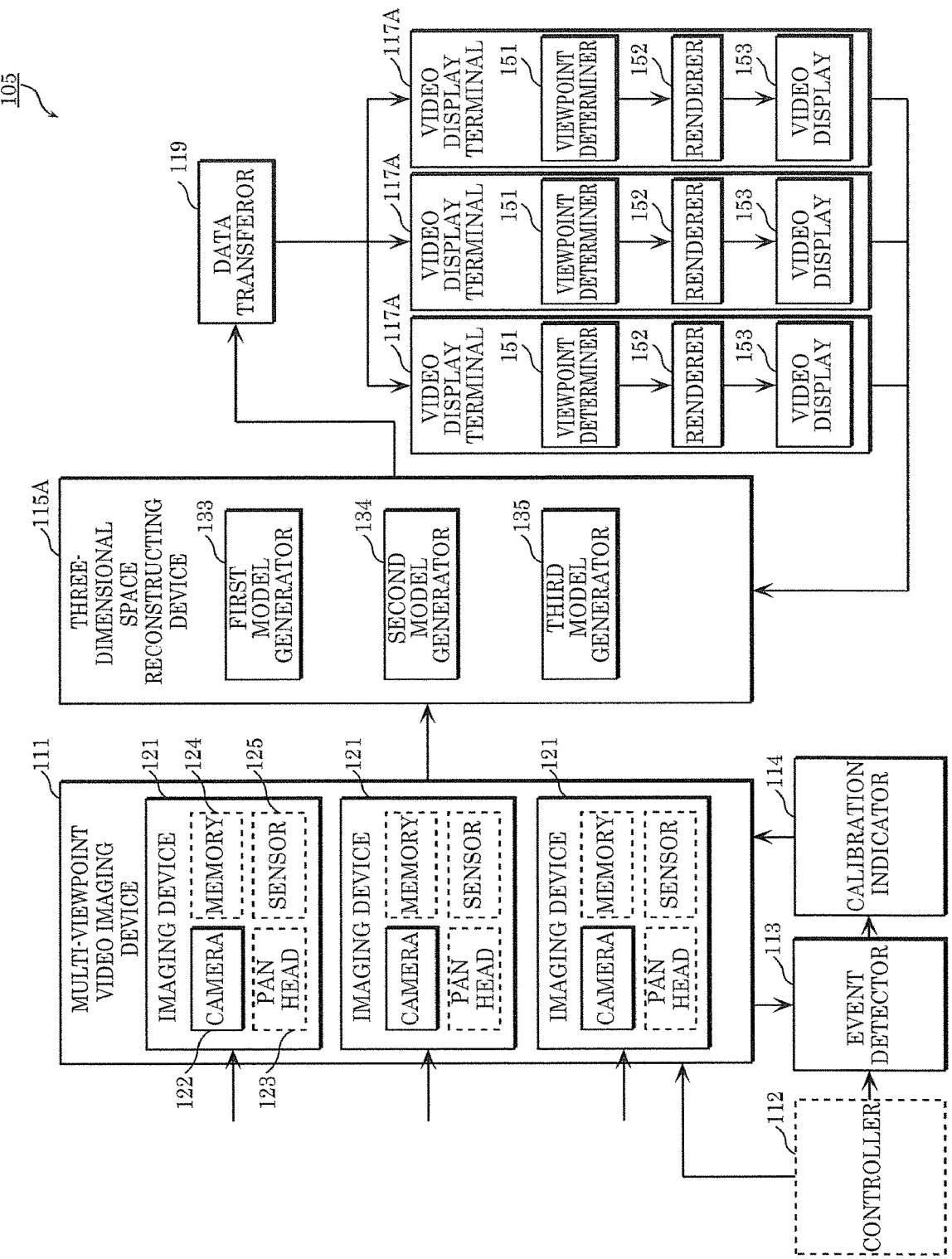
FIG. 17 is a block diagram illustrating a free-viewpoint video generating system according to Embodiment 5.

FIG. 17 is a block diagram illustrating the configuration of free-viewpoint video generating system 105 according to the present embodiment. Free-viewpoint video generating system 105 in FIG. 17 is different from free-viewpoint video generating system 103 in FIG. 11 in the configuration of the three-dimensional space reconstructing device 115A. Three-dimensional space reconstructing device 115A includes first model generator 133 for generating a first model, second model generator 134 for generating a second model, and third model generator 135 for generating a third model.

Three-dimensional space reconstructing device 115A generates a three-dimensional model including the first model, the second model, and the third model. Data transferor 119 distributes the first to third models to video display terminal 117A in different distribution modes. Three-dimensional space reconstructing device 115A updates the models with different frequencies. Data transferor 119 distributes the models to video display terminal 117A with different periods. For example, the first model is a foreground model, the second model is a part of a background model, and the third model is a background model other than the second model. In this case, if the recorded frame rate of imaging device 121 is, for example, 30 frames per second, data transferor 119 distributes 30 first models per second according to the recorded frame rate of imaging device 121. Moreover, data transferor 119 distributes the single second model per second and distributes one model as the third model at the start of viewing. Thus, regions updated with different frequencies in the background model can be distributed as different models with different periods, thereby suppressing a network band.

Data transferor 119 may add identifiers for identifying two or more models to the three-dimensional model. Thus, by analyzing the identifiers, video display terminal 117A can identify the model corresponding to the received three-dimensional model.

In this example, the three models are used. Four or more models may be used instead.

If two models are used, the two models may not be a foreground model or a background model. For example, three-dimensional data may include a first model frequently updated with a large amount of data and a second model less frequently updated with a small amount of data. Data transferor 119 may distribute the models to video display terminal 117A in different distribution modes. At this point, the models are updated with different frequencies and thus data transferor 119 distributes the models to video display terminal 117A with different periods. If the recorded frame rate of imaging device 121 is, for example, 30 frames per second, data transferor 119 distributes 30 first models per second according to the recorded frame rate of imaging device 121. Moreover, data transferor 119 distributes one model as the second model at the start of viewing. Thus, three-dimensional models with different amounts of data can be distributed with different periods, thereby suppressing the network band.

The first model and the second model may vary in significance. Data transferor 119 may distribute the models to video display terminal 117A in different distribution modes. At this point, the models vary in significance and thus data transferor 119 distributes the models to video display terminal 117A with different periods. For example, the first model is more significant while the second model is less significant. In this case, if the recorded frame rate of imaging device 121 is, for example, 30 frames per second, data transferor 119 distributes 30 first models per second and 15 second models per second according to the recorded frame rate of imaging device 121. Thus, the significant three-dimensional model can be preferentially distributed, thereby providing the user of video display terminal 117A with proper rendering video while suppressing the network band.

Data transferor 119 may switch, for example, densities other than the distribution periods according to the significance. For example, data transferor 119 may switch the densities of the models according to the priority. If data transferor 119 distributes a three-dimensional model in, for example, a soccer game, it is determined that the three-dimensional model of players playing in front of a goal is more significant while the three-dimensional model of a goal keeper near the other goal is less significant. Subsequently, data transferor 119 distributes the three-dimensional model of the goal keeper with a lower density than the more significant three-dimensional model. Data transferor 119 may not distribute the less significant three-dimensional model. Moreover, data transferor 119 determines the level of significance depending on, for example, whether the target model is close to a specific feature point or an object such as a ball or is close to a viewpoint position of many viewers. For example, a model close to a specific feature point or an object is significant and a model close to a viewpoint position viewed by many viewers is set to be significant.

Each of the models may be a set of at least one object (e.g., a person, a ball, or an automobile) identified by object recognition or the like or a set of regions such as a background and a foreground or objects that are identified according to motions.

Figure 18:
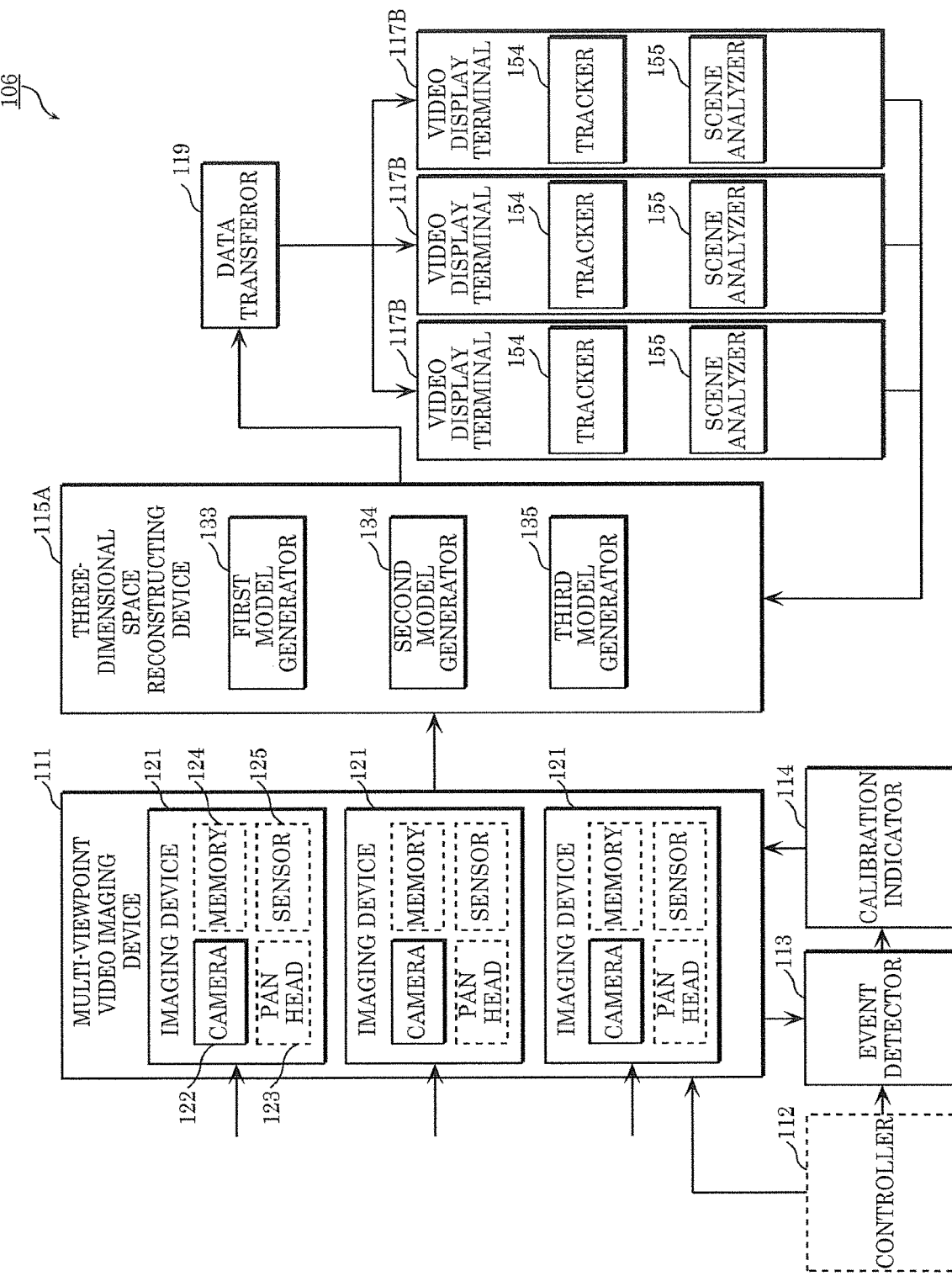
FIG. 18 is a block diagram illustrating the configuration of a next-generation monitoring system according to Embodiment 5.

The same modification is applicable to next-generation monitoring system 104 described in Embodiment 4. FIG. 18 is a block diagram illustrating the configuration of next-generation monitoring system 106 according to the present embodiment. Next-generation monitoring system 106 in FIG. 18 is different from next-generation monitoring system 104 in FIG. 15 in the configuration of three-dimensional space reconstructing device 115A. The functions of three-dimensional space reconstructing device 115A are similar to those of FIG. 17.

As described in Embodiments 1 to 4, the three-dimensional model distribution device (for example, data transferor 119) distributes a first model (e.g., a foreground model), which is a three-dimensional model of a target space in a target time period, in a first distribution mode and distributes a second model (e.g., a background model), which is a three-dimensional model of a target space in a target time period and makes a smaller change per unit time than the first model, in a second distribution mode different from the first distribution mode. In other words, the three-dimensional model distribution device separately transmits the foreground model and the background model.

For example, the transmission periods of the first model and the second model are different from each other. For example, the distribution period of the first distribution mode is shorter than that of the second distribution mode. The three-dimensional model distribution device transmits the first model at predetermined regular intervals. At this point, the three-dimensional model distribution device may transmit a differential model as a difference between the first model at the current time and the first model at a previous time. Furthermore, for the first model at the current time, the three-dimensional model distribution device may transmit motion information from the first model at the previous time.

For example, the three-dimensional model distribution device transmits the second model at the start of viewing. Moreover, the three-dimensional model distribution device transmits the second model at predetermined regular intervals. Furthermore, the three-dimensional model distribution device may transmit a differential model as a difference between the current second model and the previously transmitted second model. The three-dimensional model distribution device may transmit the second model at each random access point.

The three-dimensional model distribution device may transmit information such as a flag for discriminating between the first model and the second model.

The three-dimensional model distribution device may transmit both of the first model and the second model at random access points.

The three-dimensional model distribution device may generate the first model and the second model according to different methods. Specifically, the three-dimensional model distribution device generates the first model according to a first generating method and generates the second model according to a second generating method having different accuracy from the first generating method. For example, the three-dimensional model distribution device generates the first model according to the first generating method and generates the second model according to the second generating method having higher accuracy than the first generating method. Alternatively, the three-dimensional model distribution device generates the first model according to the first generating method and generates the second model according to the second generating method having lower accuracy than the first generating method. For example, if it is necessary to render the first model (foreground model) of a player or a criminal with maximum image quality, the three-dimensional model distribution device generates the first model with high accuracy even when the amount of data increases. In the meantime, the three-dimensional model distribution device suppresses the amount of data by reducing the accuracy of the second model of audience or a background image that is a less significant region than a foreground.

For example, from a third model that is a three-dimensional model of a plurality of objects included in a target space in a target time period and the second model (background model) that is a three-dimensional model of some of the objects included in the target space in the target time period, the three-dimensional model distribution device generates the first model (foreground model) as a difference between the third model and the second model.

For example, the three-dimensional model distribution device generates a third multi-viewpoint image (background subtracted image) as a difference between a first multi-viewpoint image (shot image) of a plurality of objects included in a target space in a target time period and a second multi-viewpoint image (background image) of some of the objects and generates the first model (foreground model) by using the third multi-viewpoint image (background subtracted image).

Alternatively, the three-dimensional model distribution device may generate the first model according to a visual hull method by using the second multi-viewpoint image (captured image) or the third multi-viewpoint image (background subtracted image) and generate the second model by using the matching results of feature points between cameras. This can reduce a throughput for generating the first model and improve the accuracy of the second model. The three-dimensional model distribution device may manually generate the second model.

The three-dimensional model distribution device may distribute data other than the three-dimensional model. For example, the data other than the three-dimensional model includes at least one of a camera parameter, a multi-viewpoint image, a background subtracted image, time information, and a starting viewpoint position.

Alternatively, the three-dimensional model distribution device may distribute the camera parameter of a stationary camera at the start of viewing and distribute the camera parameter of an unfixed camera each time the camera parameter is changed.

The viewpoint position at the start of viewing may be specified by a user at the start of viewing. The viewpoint position at the start of viewing may be changed depending on the style of viewing or the kind of a terminal. For example, in the case of viewing on television, a recommended viewpoint is selected, one of stationary cameras (e.g., near a ball or at the center of a field) is selected, or a viewpoint having a high rating is selected. In the case of viewing on a personal tablet or smartphone, a viewpoint for viewing a favorite player is selected. In the case of viewing on a head mounted display, a recommended viewpoint for VR (e.g., a viewpoint on a field) is selected.

The first model and the second model are not limited to the foreground model and the background model. Alternatively, two or more models may be generated and distributed in different distribution modes. In this case, the models are updated with different frequencies (the frequency of updating varies among regions on the background) and thus the three-dimensional model distribution device distributes the models with different periods. Moreover, the three-dimensional model distribution device adds identifiers for identifying two or more models.

Furthermore, the three-dimensional model distribution device switches an encoding method for each of the models.

For example, a first encoding method is used in the first distribution mode used for the first model. A second encoding method is used in the second distribution mode used for the second model. The first encoding method and the second encoding method vary in at least one of processing delay and encoding efficiency. For example, the second encoding method has a larger processing delay than the first encoding method. Moreover, the second encoding method has higher encoding efficiency than the first encoding method. Alternatively, the second encoding method has lower encoding efficiency than the first encoding method.

The first distribution mode may have a lower delay than the second distribution mode. For example, the three-dimensional model distribution device distributes the first model with a low delay via a reliable line (for example, IMP is used). Moreover, the three-dimensional model distribution device distributes the second model via a low-speed line (e.g., TCP is used). Alternatively, the three-dimensional model distribution device may distribute the second model in a downloadable manner (e.g., HTTP) and stream the first model (e.g., RTP).

If the three-dimensional model cannot be received by a network error or the like, a received three-dimensional model may be used by a three-dimensional model receiver (e.g., video display terminal 117A). For example, if the first model cannot be received, the three-dimensional model receiver generates a prediction model by predicting a motion from the received first model and uses the generated prediction model as a first model at the current time.

If the second model cannot be received, the three-dimensional model receiver uses the received second model. Alternatively, the three-dimensional model receiver uses a prepared model or a rendering image, e.g., a CG model or a CG image. In other words, the three-dimensional model receiver may perform error concealment on the first model and the second model in different ways.

The three-dimensional model distribution device may preferentially distribute the first model and the second model that are necessary for generating video from a user's viewpoint. For example, the three-dimensional model distribution device may distribute a first model necessary for generating video from a user's viewpoint with high accuracy and thin other first models. In other words, terminals (e.g., video display terminal 117A) at the distribution destinations of the first model and the second model generate free-viewpoint video from selected viewpoints by using the first model and the second model. The three-dimensional model distribution device preferentially distributes the first model necessary for generating free-viewpoint video.

The three-dimensional model distribution device may change the quality of a three-dimensional model to be distributed according to a usable network band. For example, the three-dimensional model distribution device changes the density or rendering resolution of the three-dimensional model according to the network band. In the case of a strict band, the three-dimensional model distribution device reduces the density of the three-dimensional model so as to lower the rendering resolution. The density of the three-dimensional model can be changed by, for example, uniform thinning or switching densities according to a target object. In the case of a strict band, the three-dimensional model distribution device reduces the temporal resolution of the three-dimensional model to be distributed. For example, the distribution period of the first model is increased.

In the examples of the foregoing description, the three-dimensional model is generated using multi-viewpoint video obtained by multi-viewpoint video imaging device 111. The method of generating the three-dimensional model (the foreground model and the background model) is not limited to the foregoing description. For example, the three-dimensional model may be generated using information obtained by means other than a camera, e.g., LIDAR (Light Detection and Ranging) or TOF (Time of Flight). Moreover, the information may be used to generate multi-viewpoint video used for generating the three-dimensional model.

The three-dimensional model may be generated in any form as long as the information indicates the three-dimensional position of a target object. For example, the three-dimensional model may be generated in the forms of point clouds, voxels, meshes, polygons, or depth information.

Although a three-dimensional space recognizing system, a free-viewpoint video generating system, and a next-generation monitoring system according to the embodiments of the present disclosure have been described above, the present disclosure is not limited to such embodiments.

Note that each of the processing units included in the three-dimensional space recognizing system, the free-viewpoint video generating system, and the next-generation monitoring system according to the embodiments is implemented typically as a large-scale integration (LSI), which is an integrated circuit (IC). They may take the form of individual chips, or one or more or all of them may be encapsulated into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

Also, the present disclosure may be embodied as various methods performed by the three-dimensional space recognizing system, the free-viewpoint video generating system, and the next-generation monitoring system.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

Although the three-dimensional space recognizing system, the free-viewpoint video generating system, and the next-generation monitoring system according to one or more aspects has been described on the basis of the embodiments, the present disclosure is not limited to such embodiments. The one or more aspects may thus include forms achieved by making various modifications to the above embodiments that can be conceived by those skilled in the art, as well forms achieved by combining structural components in different embodiments, without materially departing from the spirit of the present disclosure.

INDUSTRIAL APPLICABILITY

The present disclosure is applicable to a three-dimensional space recognizing system, a free-viewpoint video generating system, and a next-generation monitoring system.

What is claimed is:

1. A receiving method, performed by a terminal, comprising:
receiving a first encoded three-dimensional (3D) model and a second encoded 3D model from a distribution apparatus; and decoding the first encoded 3D model and the second encoded 3D model according to a first decoding scheme and a second decoding scheme different from the first decoding scheme to generate a first 3D model and a second 3D model, respectively, wherein the first 3D model and the second 3D model indicate 3D positions of a first object and 3D positions of a second object during a period, respectively, the first object being different from the second object in a 3D space, and a motion change of the first object in the period is greater than a motion change of the second object in the period.

2. The receiving method according to claim 1, wherein the first encoded 3D model and the second encoded 3D model have been encoded according to a first encoding scheme and a second encoding scheme, respectively, and the second encoding scheme has a larger processing delay than the first encoding scheme.

3. The receiving method according to claim 1, wherein the first encoded 3D model and the second encoded 3D model have been encoded according to a first encoding scheme and a second encoding scheme, respectively, and the second encoding scheme has a higher encoding efficiency than the first encoding scheme.

4. The receiving method according to claim 1, wherein the terminal receives the first encoded 3D model and the second encoded 3D model in a first distribution mode and a second distribution mode different from the first distribution mode, respectively.

5. The receiving method according to claim 1, further comprising:

displaying the first 3D model and the second 3D model on a display of the terminal.

6. A terminal comprising:

a receiver configured to receive a first encoded three-dimensional (3D) model and a second encoded 3D model from a distribution apparatus; and a processor coupled to the receiver, the processor being configured to decode the first encoded 3D model and the second encoded 3D model according to a first decoding scheme and a second decoding scheme different from the first decoding scheme to generate a first 3D model and a second 3D model, respectively, wherein the first 3D model and the second 3D model indicate 3D positions of a first object and 3D positions of a second object during a period, respectively, the first object being different from the second object in a 3D space, and a motion change of the first object in the period is greater than a motion change of the second object in the period.

7. A terminal comprising:

a receiver configured to receive from a distribution apparatus:

a first model indicating three-dimensional (3D) positions of a first object in a 3D space at a first timing; and a difference model indicating difference between the first model and a second model, the second model indicating 3D positions of the first object in the 3D space at a second timing different from the first timing; and a processor coupled to the receiver, the processor being configured to generate the second model based on the first model and the difference model.

8. The terminal according to claim 7, wherein the processor is configured to synthesize the first model and the difference model to generate the second model.

9. The terminal according to claim 7, wherein the receiver is configured to receive motion information indicating prediction of motion of the first object, the processor is configured to generate a prediction model based on the motion information and the first model, and the processor is configured to synthesize the difference model and the prediction model to generate the second model.

10. The terminal according to claim 7, further comprising:

receiving a third model indicating 3D positions of a second object in the 3D space at the first timing, wherein the first object is a foreground object and the second object is a background object.

11. The terminal according to claim 7, further comprising:

receiving a third model indicating 3D positions of a second object in the 3D space at the first timing, wherein the first object is a background object and the second object is a foreground object.

* * * * *

UNITED STATES PATENT AND TRADEMARK OFFICE
CERTIFICATE OF CORRECTION

| | | |
|---|---|---|
| PATENT NO. | : 11,240,483 B2 | Page 1 of 1 |
| APPLICATION NO. | : 17/088881 | |
| DATED | : February 1, 2022 | |
| INVENTOR(S) | : Sugio et al. | |

It is certified that error appears in the above-identified patent and that said Letters Patent is hereby corrected as shown below:

On the Title Page

Please insert the following item (73) Assignee as follows:
--(73) Assignee: PANASONIC INTELLECTUAL PROPERTY CORPORATION OF AMERICA, Torrance, CA (US)--.

Signed and Sealed this
Twenty-sixth Day of April, 2022

Katherine Kelly Vidal
*Director of the United States Patent and Trademark Office*